(12) United States Patent
Tsuboi et al.

(10) Patent No.: US 10,702,112 B2
(45) Date of Patent: Jul. 7, 2020

(54) SELF-PROPELLED ELECTRONIC DEVICE

(71) Applicant: SHARP KABUSHIKI KAISHA, Sakai, Osaka (JP)

(72) Inventors: Masanori Tsuboi, Sakai (JP); Toshihiro Senoo, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 332 days.

(21) Appl. No.: 15/751,648

(22) PCT Filed: Aug. 2, 2016

(86) PCT No.: PCT/JP2016/072672
§ 371 (c)(1),
(2) Date: Feb. 9, 2018

(87) PCT Pub. No.: WO2017/081892
PCT Pub. Date: May 18, 2017

(65) Prior Publication Data
US 2018/0235421 A1    Aug. 23, 2018

(30) Foreign Application Priority Data
Nov. 11, 2015  (JP) .................................. 2015-221494

(51) Int. Cl.
*A47L 9/28* (2006.01)
*G05D 1/02* (2020.01)

(52) U.S. Cl.
CPC .......... *A47L 9/2826* (2013.01); *A47L 9/2852* (2013.01); *A47L 9/2894* (2013.01); *G05D 1/02* (2013.01);
(Continued)

(58) Field of Classification Search
CPC .... A47L 9/2826; A47L 9/2894; A47L 9/2852; A47L 2201/022; A47L 2201/04;
(Continued)

(56) References Cited

U.S. PATENT DOCUMENTS 7,411,744 B2 * 8/2008 Chen ...................... G01C 21/02
318/568.12
8,763,199 B2 * 7/2014 Jones ................... A47L 11/4061
15/319

(Continued)

FOREIGN PATENT DOCUMENTS

| JP | 2005-211360 A | 8/2005 |
| TW | M294508 U | 7/2006 |
| TW | 200742950 A | 11/2007 |

*Primary Examiner* — Jason Holloway
(74) *Attorney, Agent, or Firm* — ScienBiziP, P.C.

(57) ABSTRACT

A self-propelled electronic device including: at least one drive wheel disposed at a bottom of a housing, the drive wheel traveling the housing while being displaced in a vertical direction in accordance with undulations of a floor surface; a drive wheel sensor for detecting a position of the drive wheel relative to the housing; a floor detection sensor for detecting a distance between the bottom of the housing and the floor surface; and a travel control unit for determining and deciding a course of the housing based on the determination that there exists a step on the floor surface if the distance detected by the floor detection sensor is longer than a predetermined reference distance, or, otherwise, the position of the drive wheel detected by the drive wheel sensor is lower than a predetermined reference position, by successively referring to output of the drive wheel sensor and the floor detection sensor, wherein, if the position of the drive wheel detected by the drive wheel sensor is lower than a predetermined reference position, the travel control unit further refers to the distance detected by the floor detection sensor, and if the distance detected by the floor detection (Continued)

sensor is longer than the predetermined reference distance, the travel control unit perform the avoidance traveling control of the housing to avoid the step, and travels the housing, whereas, if the distance detected by the floor detection sensor is the predetermined reference distance or shorter, the travel control unit does not perform the avoidance traveling control of the housing, and continues the traveling of the housing.

7 Claims, 16 Drawing Sheets

(52) U.S. Cl.
CPC .......... *G05D 1/0212* (2013.01); *A47L 9/2873* (2013.01); *A47L 2201/02* (2013.01); *A47L 2201/022* (2013.01); *A47L 2201/04* (2013.01); *G05D 2201/0203* (2013.01); *G05D 2201/0215* (2013.01)

(58) Field of Classification Search
CPC . A47L 2201/02; A47L 9/2873; G05D 1/0212; G05D 1/02; G05D 2201/0215; G05D 2201/0203
See application file for complete search history.

(56) References Cited

U.S. PATENT DOCUMENTS

| | | | |
|---|---|---|---|
| 9,104,204 B2* | 8/2015 | Jones | G05D 1/0219 |
| 9,442,488 B2* | 9/2016 | Shamlian | G05D 1/0227 |
| 2007/0145235 A1 | 6/2007 | Chen | |
| 2007/0293995 A1 | 12/2007 | Sun et al. | |
| 2009/0045766 A1* | 2/2009 | Casey | G05D 1/0238 318/568.16 |
| 2014/0257622 A1* | 9/2014 | Shamlian | G05D 1/0238 701/26 |
| 2015/0265125 A1* | 9/2015 | Lee | A47L 11/4061 701/26 |

* cited by examiner

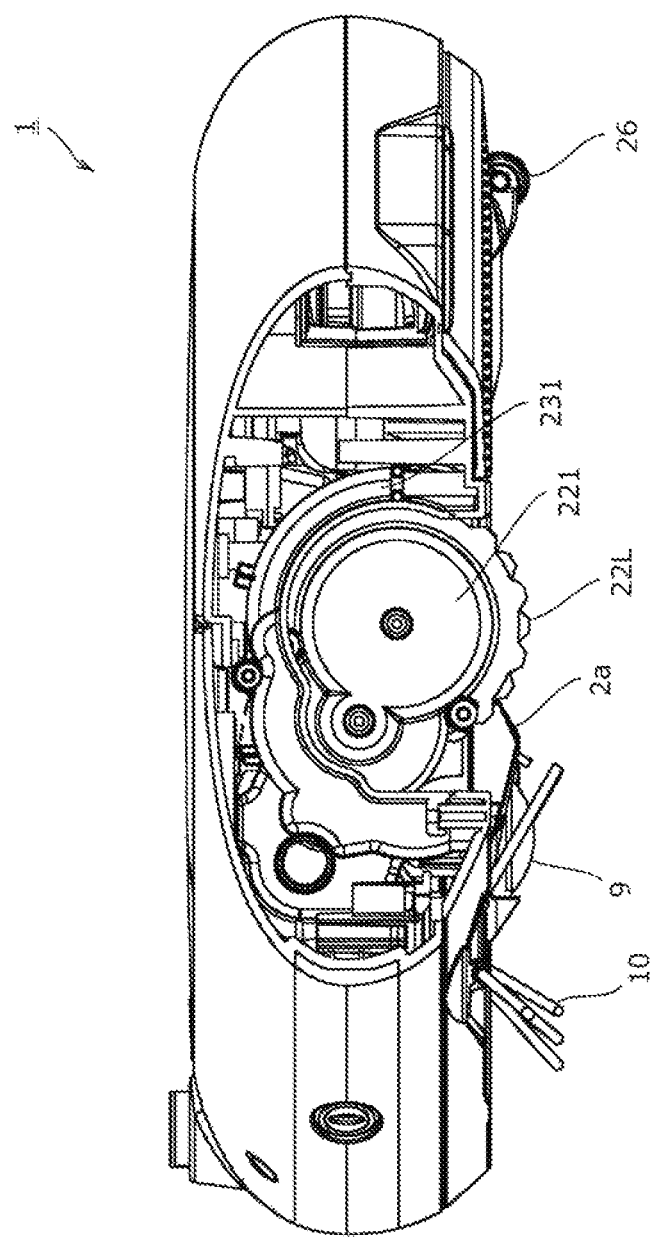

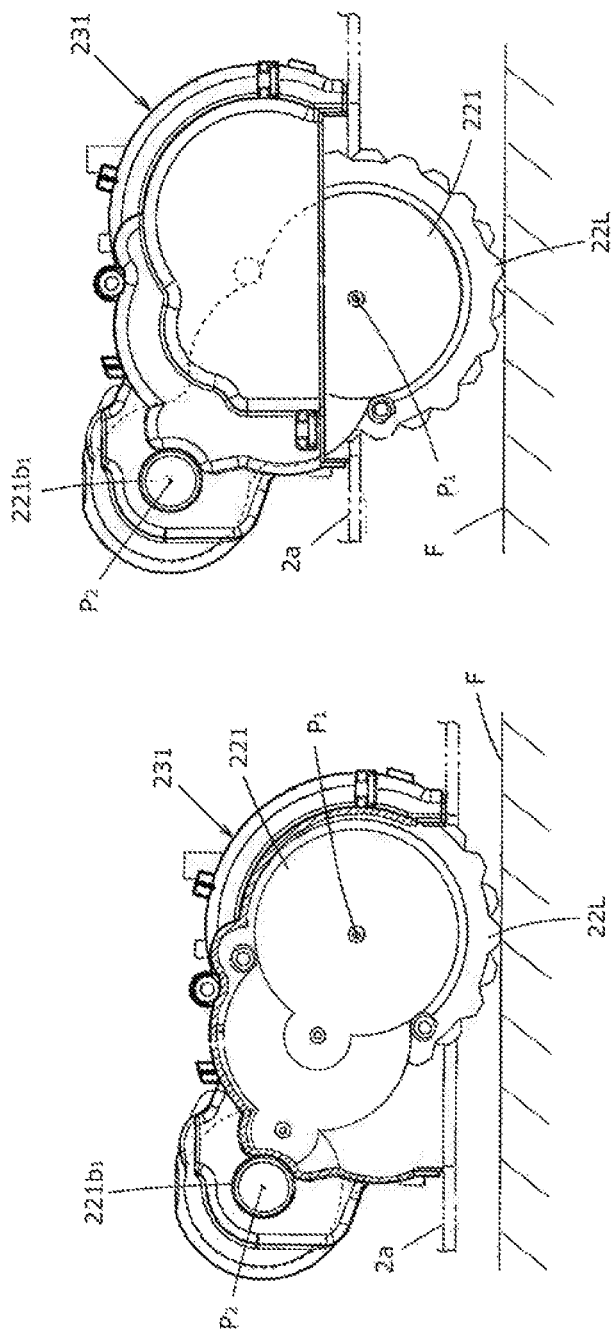

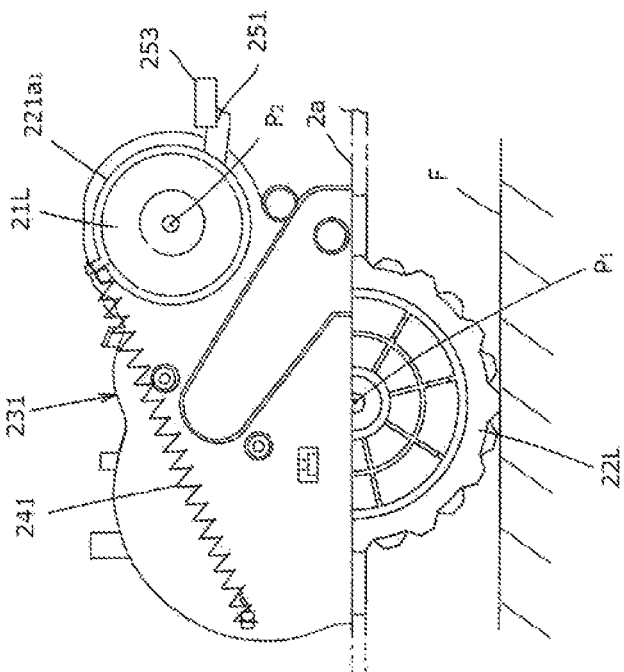
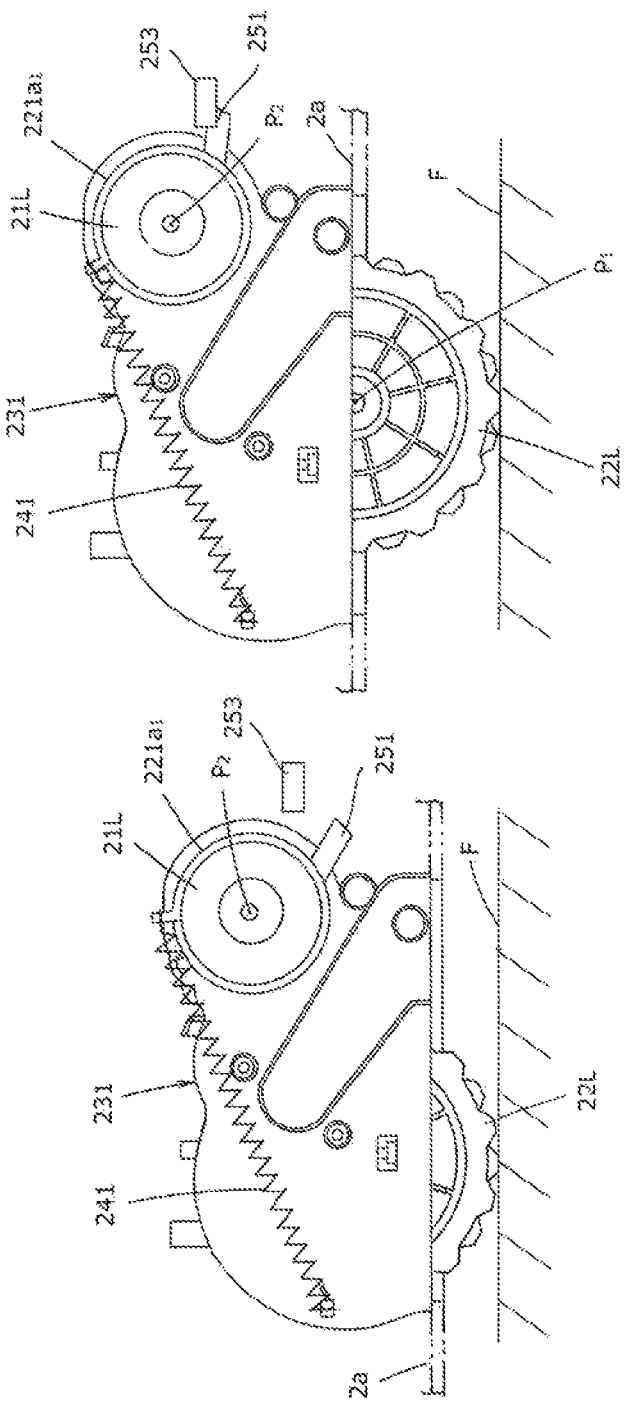

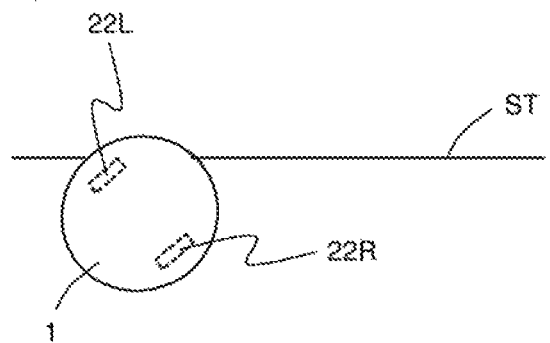
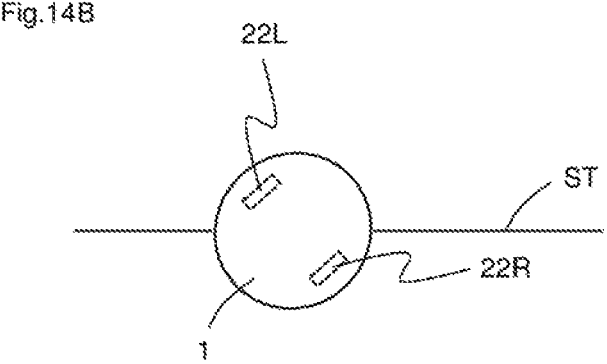
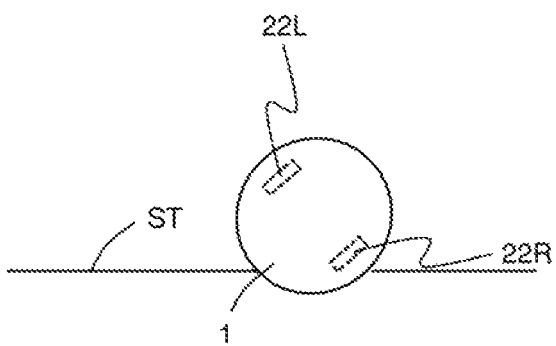

SELF-PROPELLED ELECTRONIC DEVICE

TECHNICAL FIELD

The present invention relates to a self-propelled electronic device, and more particularly to a self-propelled electronic device capable to travel on a floor surface with a step or the like while avoiding derailing or falling.

BACKGROUND ART

A so-called autonomous traveling type electric vacuum cleaner (i.e. referred to as a cleaning robot or an autonomous traveling type vacuum cleaner) for traveling on a floor surface while detecting an obstacle on the floor surface using a sensor and cleaning the floor surface by autonomously traveling the floor surface has been known. Other than the electric vacuum cleaner, autonomous traveling devices for performing, for example, indoor air clean, factory security and work such as transportation of luggage have been known. In this specification, these devices having autonomous traveling function are collectively referred to as a self-propelled electronic device.

Such a self-propelled electronic device is provided with various sensors for performing safety and secure self-propelled traveling.

For example, a self-propelled electronic device disclosed in Patent Document 1 includes, as traveling sensors for detecting an obstacle on a floor surface for self-propelled travelling, a front sensor and a ceiling sensor. The front sensor is provided for measuring a distance to an obstacle including a step, wall, column, furniture, and leg of a table or bed, etc. positioned at a lower forward of the self-propelled electronic device. The ceiling sensor is provided for detecting whether or not the self-propelled electronic device can pass below an obstacle at an upper forward of the self-propelled electronic device.

Further, Patent Document 1 discloses that the self-propelled electronic device includes a lifting switch for detecting lifting of a drive wheel from a floor surface, and a step sensor for detecting a level difference of the step on the floor surface positioned at the forward of the self-propelled electronic device. When the lifting switch detects the lifting of the drive wheel from the floor surface, it is detected by the output from the step sensor that the self-propelled electronic device is positioned near, namely, within a certain distance from the floor surface. In such a case, it is detected that a drive wheel is derailed by the level difference of the step on the floor surface. Then, the drive wheel is further driven to attempt an escape from the level difference of the step. When it is detected that the self-propelled electronic device is positioned far away from the certain distance from the floor surface, it is detected that the self-propelled electronic device is lifted up by a user, so that the drive wheel stops according to the disclosure of Patent Document 1.

CITATION LIST

Patent Document

Patent Document 1: Japanese Unexamined Patent Publication No. 2005-211360

SUMMARY OF THE INVENTION

Problem to be Solved by the Invention

By detecting such a vertical displacement of a drive wheel, in particular, the lifting of the drive wheel from the floor surface, it may be possible to secure the safety of the user when a self-propelled electronic device is lifted up as disclosed in Patent Document 1, and, in addition, to prevent wasteful loss of a battery. But, it is not all. For example, when a bottom of a housing of the self-propelled electronic device rides on a ridge line of an obstacle or step protruding from the floor surface, so that the drive wheel is lifted up, slip may be caused between the floor surface and the traveling may stop. If the traveling falls into such a condition, in order to prevent scratching the floor surface by the idle driving wheel, it may be preferable to stop the driving wheel when it is detected that the driving wheel is lifted up. Hereinafter, in this specification, a sensor for detecting the position of the driving wheel relative to the housing of the self-propelled electronic device is referred to as a drive wheel sensor. The drive wheel sensor encompasses a function of the lifting switch disclosed in Patent Document 1, so that the drive wheel sensor detects that the drive wheel is lifted up when the user lifts up the self-propelled electronic device. A sensor for detecting the distance between the bottom of the housing of the self-propelled electronic device and the floor surface is referred to as a floor detection sensor. Similar to the step sensor disclosed in Patent Document 1, the floor detection sensor detects the distance between the bottom of the housing and the floor surface.

Meanwhile, when the drive wheel sensor detects the lifting of the drive wheel, there is a possibility of changing the course and avoiding the obstacle, before the drive wheel rides on the obstacle and the drive wheel completely slips. It may be more preferable that it is first to perform avoidance traveling control, and then, if the lifting of the drive wheel cannot be yet resolved, the drive wheel is stopped.

However, because there are a variety of undulations of the floor surface, on which the self-propelled electronic device travels, and a variety of shapes of obstacles, it is not suitable necessarily to perform the avoidance traveling control in response to the detection of the lifting of the drive wheel.

If it is such a low step that the floor detection sensor does not detect a step, the self-propelled electronic device usually can ride over the low step and travel down over it. For example, it is assumed that a self-propelled electronic device enters a step from an oblique direction to the step, and passes through the step. Although the step lifts up one of the wheels, temporarily, there is a strong likelihood that the self-propelled electronic device will ride over the step, by simply continuing the traveling. Therefore it is needless to perform the avoidance traveling control in response thereto.

If the avoidance traveling control is performed, rather, it is considered that there is a case where the self-propelled electronic device may fall into a state of being stuck. If it falls into such a state, the lifting of the drive wheels is continued over a predetermined time period. Then, because the lifting of the drive wheels cannot be resolved, the drive wheels are stopped.

The present invention is accomplished in view of the above circumstances and aims to provide a self-propelled electronic device which avoids traveling of such a step over whose height the self-propelled electronic, device cannot travel and, on the contrary, which does not avoid traveling of such a step over whose height it can travel, and continues traveling, so that the self-propelled electronic device smoothly travels regardless a variety of undulations of the floor surface and shapes of obstacles.

Means for Solving the Problems

The present invention provides a self-propelled electronic device including: at least one drive wheel disposed at a bottom of a housing, the drive wheel traveling the housing while being displaced in a vertical direction in accordance with undulations of a floor surface; a drive wheel sensor for detecting a position of the drive wheel relative to the housing; a floor detection sensor for detecting a distance between the bottom of the housing and the floor surface; and a travel control unit for deciding a course of the housing based on the determination that there exists a step on the floor surface if the distance detected by the floor detection sensor is longer than a predetermined reference distance, or, otherwise, the position of the drive wheel detected by the drive wheel sensor is lower than a predetermined reference position, by successively referring to output of the drive wheel sensor and the floor detection sensor, wherein, if the position of the drive wheel detected by the drive wheel sensor is lower than a predetermined reference position, the travel control unit further refers to the distance detected by the floor detection sensor, and if the distance detected by the floor detection sensor is longer than the predetermined reference distance, the travel control unit changes the course of the housing to avoid the step, and travels the housing, whereas, if the distance detected by the floor detection sensor is the predetermined reference distance or shorter, the travel control unit does not change the course of the housing, and continues the traveling of the housing.

Effect of the Invention

According to the present invention, if the position of the drive wheel detected by the drive wheel sensor is lower than a predetermined reference position, the travel control unit further refers to the distance detected by the floor detection sensor, and if the distance detected by the floor detection sensor is longer than the predetermined reference distance, the avoidance traveling control is performed, whereas if the distance detected by the floor detection sensor is the predetermined reference distance or shorter, the avoidance traveling control is not performed, and continues traveling. Accordingly, a self-propelled electronic device can be provided which avoids such a step over whose height the self-propelled electronic device cannot travel and, on the contrary, which does not avoid such a step over whose height it can travel, and continues traveling, so that the self-propelled electronic device smoothly travels regardless a variety of undulations of the floor surface and shapes of obstacles

BRIEF DESCRIPTION OF THE DRAWINGS

FIG. 6 is a vertical sectional view of a portion including a drive wheel unit in the self-propelled vacuum cleaner illustrated in FIG. 2.

FIG. 7A is a first explanatory view illustrating a state in which a drive wheel unit of a self-propelled electronic device is displaced relative to a housing in the vertical direction according to one embodiment of the present invention (the drive wheel unit is at an upper position).

FIG. 7B is a second explanatory view illustrating a state in which a drive wheel unit of a self-propelled electronic device is displaced relative to a housing in the vertical direction according to one embodiment of the present invention (the drive wheel unit is at a lower position).

FIG. 8A is an explanatory view illustrating the state of the drive wheel unit of the self-propelled electronic device corresponding to FIG. 7A (the drive wheel unit is at the upper position).

FIG. 8B is an explanatory view illustrating the state of the drive wheel unit of the self-propelled electronic device corresponding to FIG. 7B (the drive wheel unit is at the lower position).

FIG. 14A is an explanatory view illustrating a state immediately before a self-propelled vacuum cleaner enters a step from an oblique direction thereto according to one embodiment of the present invention (Embodiment 1).

FIG. 14B is an explanatory view drawing illustrating a state in which a self-propelled vacuum cleaner enters a step from an oblique direction thereto and one wheel of the self-propelled vacuum cleaner rides over the step according to one embodiment of the present invention (Embodiment 1).

FIG. 14C is an explanatory view illustrating a state in which a self-propelled vacuum cleaner enters a step from an oblique direction thereto and the self-propelled vacuum cleaner passes the step according to one embodiment of the present invention (Embodiment 1).

MODE FOR CARRYING OUT THE INVENTION

Hereinafter, the present invention will be described in more detail with reference to the drawings. Note that the description below is an exemplification in all respects, and should not be construed to restrict the invention.
<<Specific Embodiment of Self-Propelled Electronic Device>>

A self-propelled vacuum cleaner will be described in the embodiments below as one example of a self-propelled electronic device according to the present invention.

Figure 1:
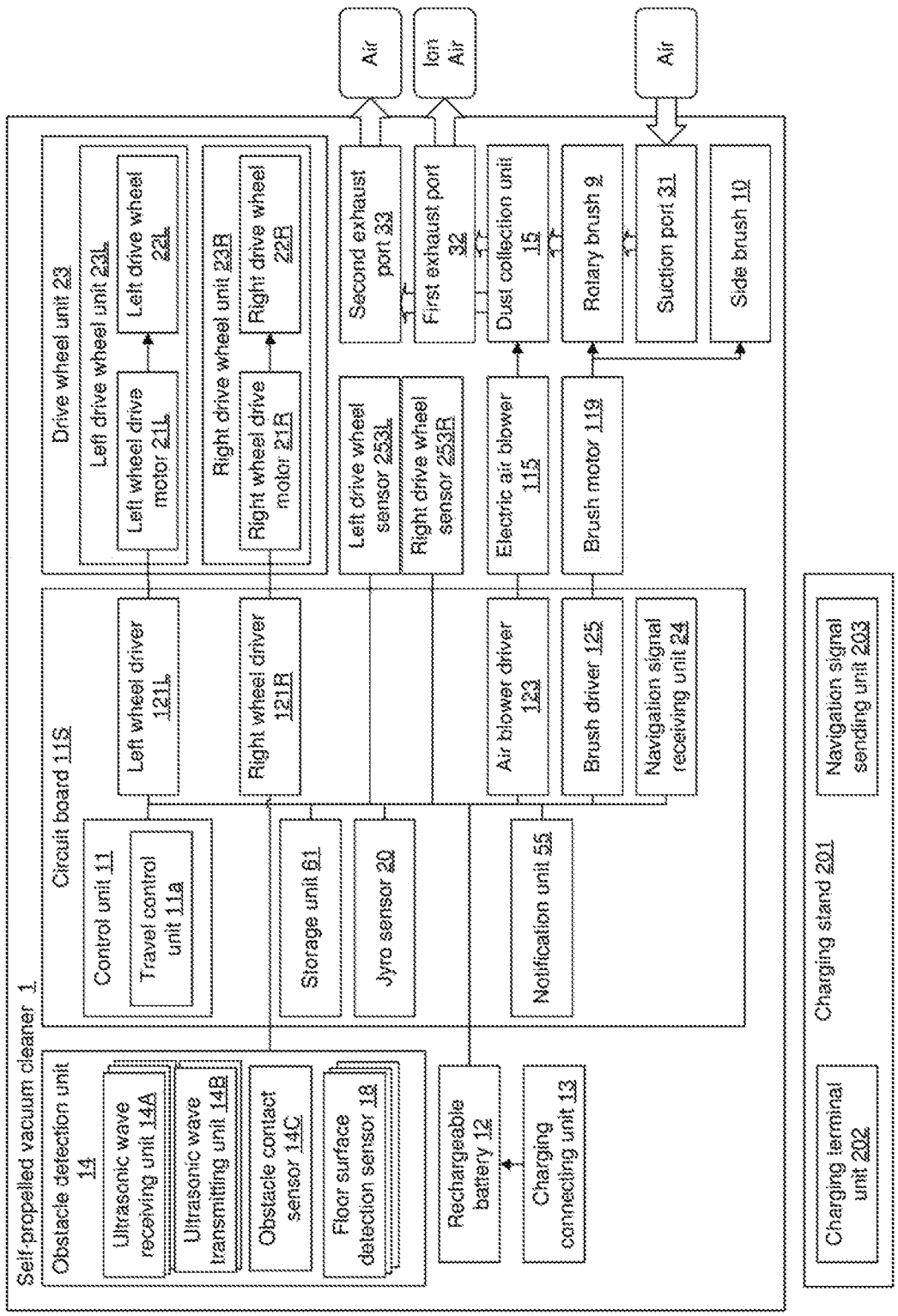
FIG. 1 is a block diagram illustrating a schematic electric configuration of a self-propelled vacuum cleaner which is one embodiment of a self-propelled electronic device according to the present invention.
Figure 2:
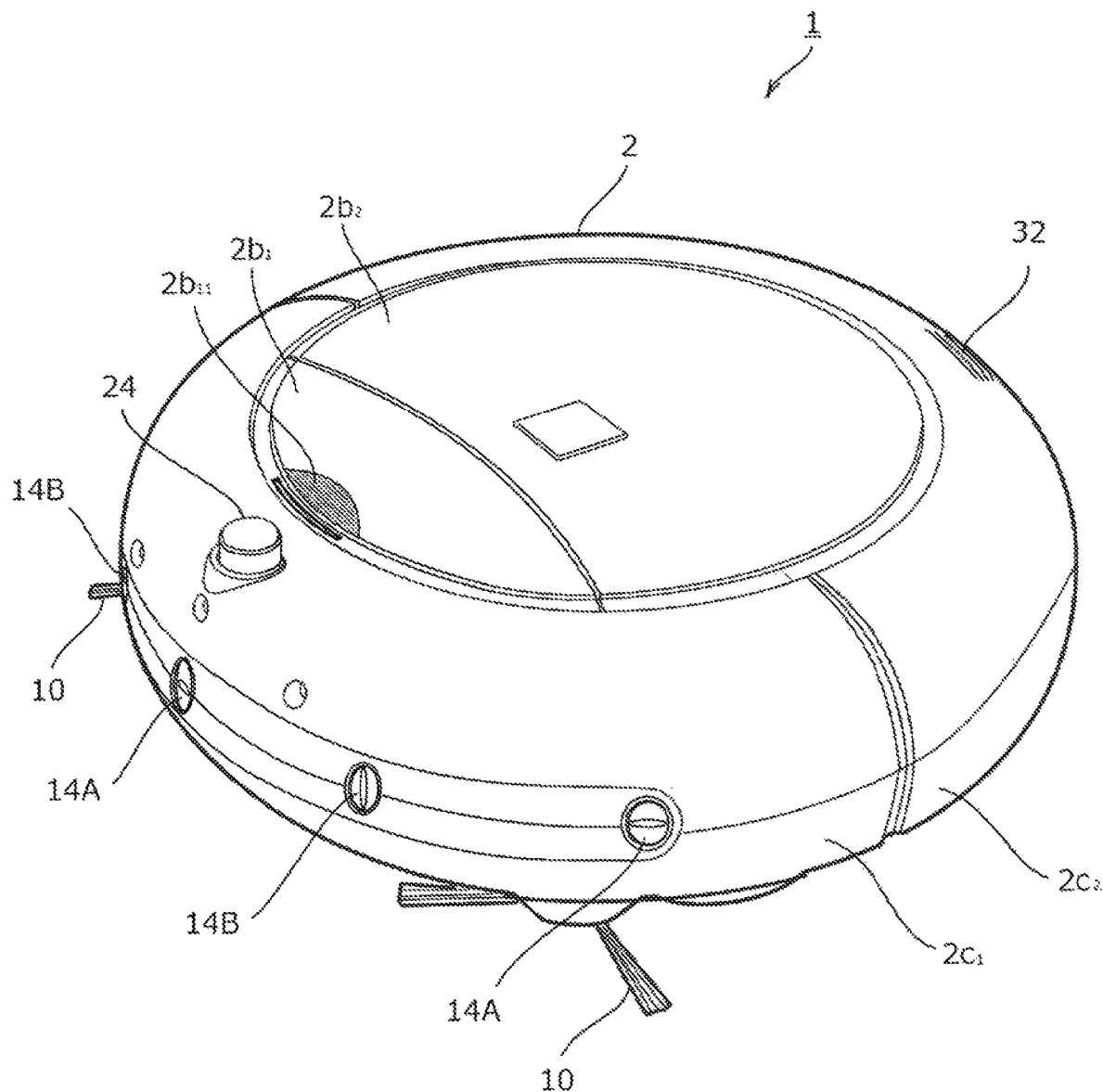
FIG. 2 is a perspective view schematically illustrating an external appearance of a self-propelled vacuum cleaner which is one embodiment of a self-propelled electronic device according to the present invention.
Figure 3:
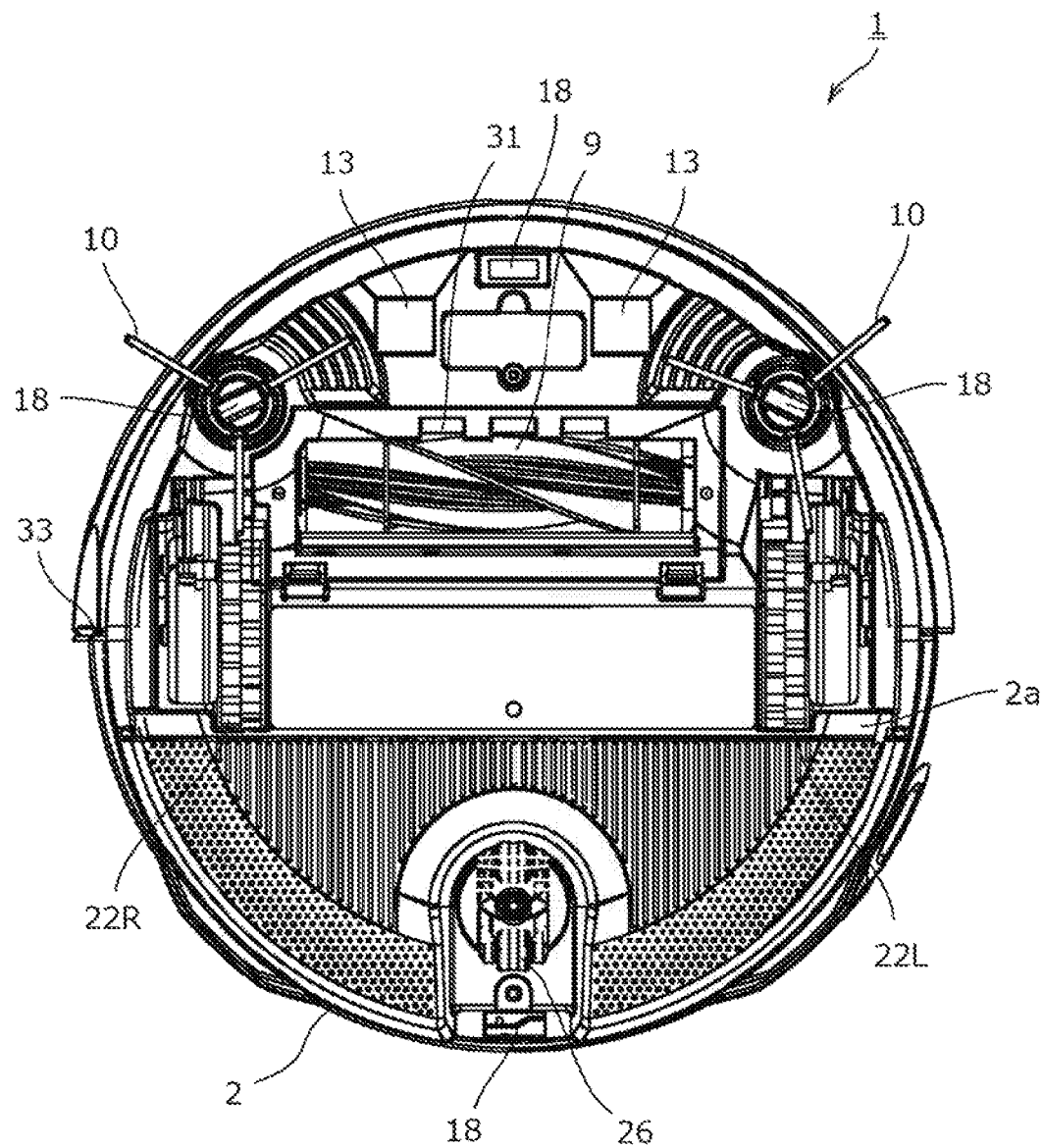
FIG. 3 is a bottom view schematically illustrating a bottom surface of the self-propelled vacuum cleaner illustrated in FIG. 2.
Figure 4:
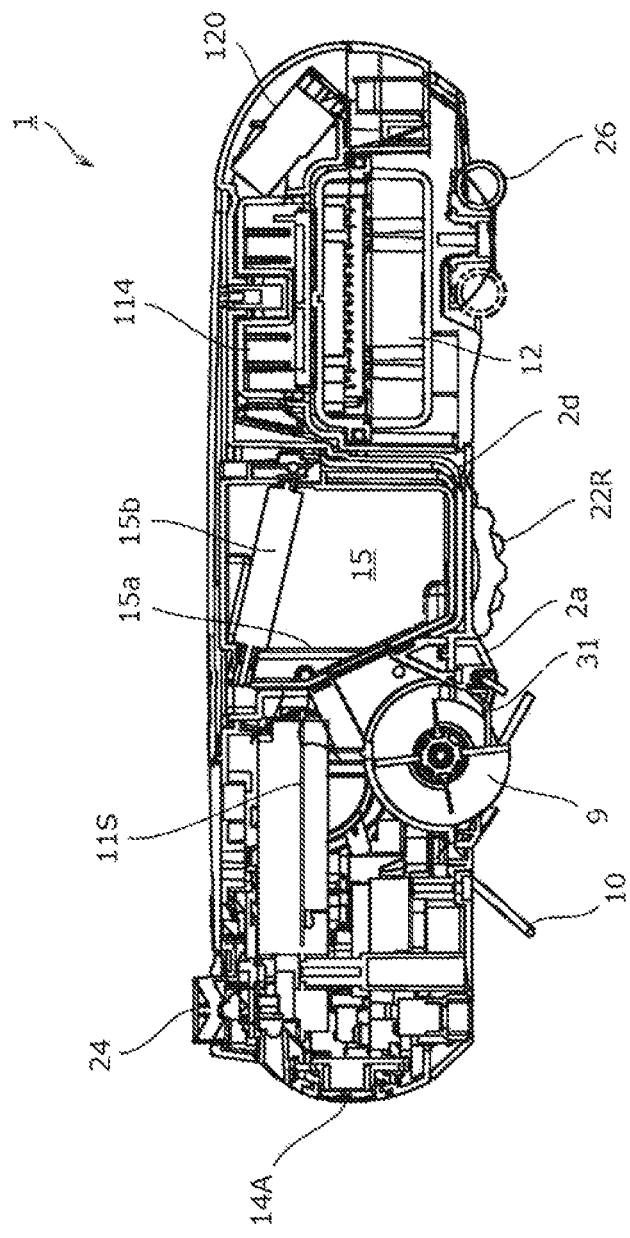
FIG. 4 is a vertical sectional view along a longitudinal direction of the self-propelled vacuum cleaner illustrated in FIG. 2.
Figure 5:
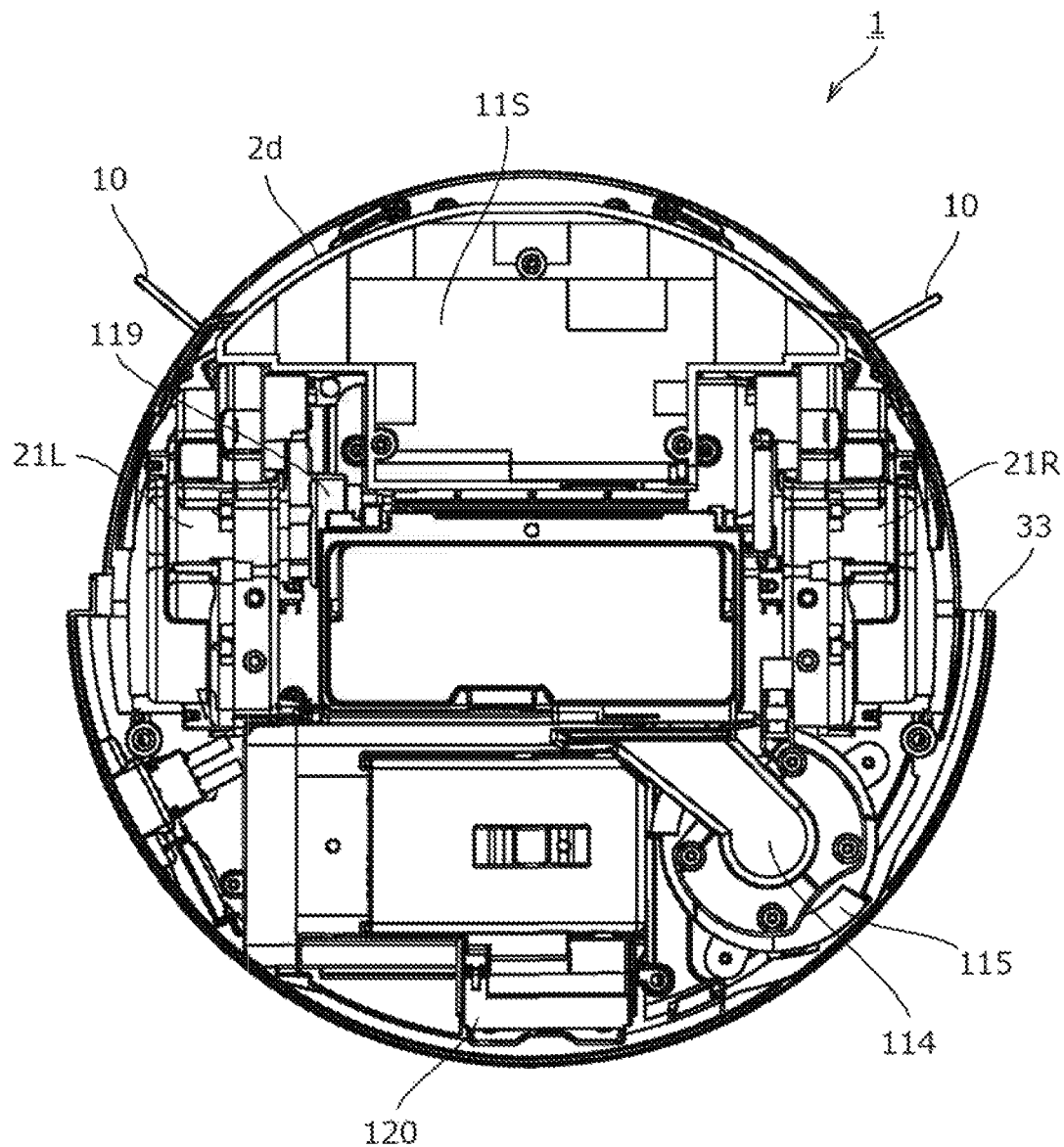
FIG. 5 is a horizontal sectional view of the self-propelled vacuum cleaner illustrated in FIG. 2.

FIG. 1 is a block diagram illustrating a schematic electric configuration of a self-propelled vacuum cleaner which is one embodiment of a self-propelled electronic device according to the present invention. FIG. 2 is a perspective view schematically illustrating an external appearance of a self-propelled vacuum cleaner which is one embodiment of a self-propelled electronic device according to the present invention. FIG. 3 is a bottom view schematically illustrating a bottom surface of the self-propelled vacuum cleaner illustrated in FIG. 2. FIG. 4 is a vertical sectional view along a longitudinal direction of the self-propelled vacuum cleaner illustrated in FIG. 2. FIG. 5 is a horizontal sectional view of the self-propelled vacuum cleaner illustrated in FIG. 2.
<<Configuration of Self-Propelled Vacuum Cleaner>>

As illustrated in FIGS. 2 and 3, the self-propelled vacuum cleaner 1 according to Embodiment 1 of the present invention includes a flat-disc shaped housing 2. Besides, in the case of Embodiment 1, the housing 2 is disc-shaped, hut it is not limited to this. For example, the shape in a plan view may be oval or polygonal.

The housing 2 includes a top plate which is formed in a circle shape. The top plate is composed of a top plate front part $2b_1$ for forming a front, and a lid part $2b_2$ for forming from an intermediate portion to a rear. The lid part $2b_2$ is upward opened by a fulcrum of a hinge (not shown) arranged at a side of a boundary area with the top plate front part $2b_1$. A front end of the top plate front part $2b_1$ is provided with a plurality of air apertures $2b_{11}$ for releasing heat from a circuit board 11S disposed in an inside.

The housing 2 includes a side plate and a bottom plate $2a$ which is formed in an annular shape. As illustrated in FIGS. 4 and 5, the housing 2 includes an inner structural wall $2d$. The side plate is composed of a side plate front half part $2c_1$ and a side plate rear half part $2c_2$ each of which is arc-shaped. In order to function as a bumper, the side plate front half part $2c_1$ is movably engaged with the inner structural wall $2d$ via an elastic material (not shown). An obstacle contact sensor 14C for detecting collision of the side plate front half part $2c_1$ is provided in the inside of the side plate front half part $2c_1$ (not shown in FIGS. 2-5). Further, a ultrasonic wave receiving unit 14A is mounted on three places of a front place, a left oblique-forward place and a right oblique-forward place in the side plate front half part $2c_1$, and, on the other hand, another ultrasonic wave transmitting unit 14B is mounted on two places among the three places of the ultrasonic wave receiving unit 14A. Further, a navigation signal receiving unit 24 and a charge connector unit 13 are provided at a position of a front surface of the housing 2 which are positioned in a visible position from the outside.

The housing 2 includes a suction port 31 provided on the bottom plate $2a$ of the bottom, a first exhaust port 32 provided at the rear of obliquely upward, and a second exhaust port 33 provided on an outer peripheral portion. A dust collection unit 15 and an electric air blower 115 are disposed in the housing 2. The dust collection unit 15 is a unit for collecting indoor debris and dust, including a dust container 15a and a dust collecting filter 15b. An inlet port leading to an inlet channel communicating with the suction port 31, and an exhaust port leading to a duct 114 communicating with the electric air blower 115 are formed in the dust container 15a.

The second exhaust port 33 is opened toward the front and is configured to blow toward the approximately front of the air flow passing through the dust collection unit 15 and the electric air blower 115.

A first half portion of the self-propelled vacuum cleaner 1 has a rotary brush 9 disposed behind the suction port 31, side brushes 10 each formed at a right oblique front and a left oblique front of the suction port 31, and drive wheels (a left drive wheel 22L and a right drive wheel 22R) each formed at a right oblique front and a left oblique front of the suction port 31. The rotary brush 9 and the side brushes 10 are driven and rotated by a brush motor 119. Further, a rotatable rear wheel 26 is provided at a middle position in the lateral direction of the second half portion of the bottom surface. A wheel of the rear wheel 26 is rotatable. Besides, in FIGS. 3 and 4, a two-dot chain line shows a state in which the rotatable rear wheel 26 is rotated at 180° forward.

The self-propelled vacuum cleaner 1 sucks air including dust on a floor surface (a travel surface) in a region where the cleaner is positioned, while autonomously traveling on the floor surface, and exhausts air from which the dust is removed to thereby clean the floor surface. The self-propelled vacuum cleaner 1 according to the present invention has a function of autonomously avoiding an obstacle detected by an obstacle detection unit 14, and autonomously returning to a charging stand, not illustrated, after finishing cleaning.

As illustrated in FIG. 1, the self-propelled vacuum cleaner 1 mainly includes the rotary brush 9, the side brushes 10, the circuit board 11S having a control unit 11, a rechargeable battery 12, a charging connecting unit 13, the obstacle detection unit 14, and the dust collection unit 15. The self-propelled vacuum cleaner 1 also includes a jyro sensor 20 (not shown in FIGS. 2-5), a left wheel drive motor 21L, a right wheel drive motor 21R, a left drive wheel 22L, a right drive wheel 22R, and the navigation signal receiving unit 24.

The left wheel drive motor 21L; the left drive wheel 22L; a drive transmission mechanism for transmitting driving force of the left wheel drive motor 21L to the left drive wheel 22L; as well as a suspension part of the left drive wheel 22L; and a support member coupled to the bottom plate $2a$ for supporting the drive transmission mechanism constitute a left drive wheel unit 23L. The right wheel drive motor 21R; the right drive wheel 22R; another drive transmission mechanism for transmitting driving force of the right wheel drive motor 21R to the right drive wheel 22R, as well as a suspension part of the right drive wheel 22R; and another support member coupled to the bottom plate 2a for supporting the drive transmission mechanism constitute a right drive wheel unit 23R.

The left wheel drive motor 21L and the right wheel drive motor 21R include an encoder not shown). The control unit 11 is responsive to the signal from the encoder for obtaining a distance by which the self-propelled vacuum cleaner 1 travels. Further, the self-propelled vacuum cleaner 1 includes a notification unit 55, a storage unit 61, an electric air blower 115, a brush motor 119, and an ion generation unit 120. The obstacle detection unit 14 includes an ultrasonic wave receiving unit 14A, an ultrasonic wave transmitting unit 14B, an obstacle contact sensor 14C and a floor surface detection sensor 18. The floor surface detection sensors 18 are mounted on 4 places, namely, (1) a center in the lateral direction of the base of the housing 2 and a front end in the longitudinal direction of the base of the housing 2; (2) a center in the lateral direction of the base of the housing 2 and a rear end in the longitudinal direction of the base of the housing 2; (3) an axial position of the left side brush 10; and (4) an axial position of the right side brush 10.

The circuit board 11S includes a left wheel driver 121L for driving the left wheel drive motor 21L, a right wheel driver 121R for driving the right wheel drive motor 21R, an air blower driver 123 for driving the electric air blower 115, and a brush driver 125 for driving the brush motor 119.

The control unit 11 controls an operation of each component of the self-propelled vacuum cleaner 1, and it is implemented mainly by a microcomputer composed of a CPU, a RAM, an I/O controller, a timer, and the like. The control unit 11 compasses a function as a travel control unit 11a for controlling traveling of the self-propelled vacuum cleaner 1.

Based on a control program which is preliminarily stored in the later-described storage unit 61 and developed in the RAM, the CPU causes each hardware item to operate organically to thereby execute a cleaning function, a traveling function, and the like according to the present invention.

The storage unit 61 is a non-volatile memory for storing information necessary for implementing various functions of the self-propelled vacuum cleaner 1 and a control program. In this embodiment, a flash memory is used.

The obstacle detection unit 14, in particular, the ultrasonic wave receiving unit 14A and the ultrasonic wave transmitting unit 14B, is provided for detecting that the self-propelled vacuum cleaner 1 comes in contact with or comes close to an obstacle such as a wall, a desk, or a chair in a room during traveling. It is used so that the self-propelled vacuum cleaner 1 travels along the wall and the obstacle while detecting them. The ultrasonic wave receiving unit 14A can measure an approximate distance to the obstacle. The obstacle detection unit 14 detects approaching to the obstacle, using the ultrasonic wave receiving unit 14A and the ultrasonic wave transmitting unit 14B. A non-contact sensor of another type such as an infrared ranging sensor may be used instead of, or together with the ultrasonic wave receiving unit 14A and the ultrasonic wave transmitting unit 14B.

The obstacle contact sensor 14C detects that the self-propelled vacuum cleaner 1 contacts an obstacle during traveling. For this purpose, the obstacle contact sensor 14C is mounted, e.g., at the inside of the side plate front half part $2c_1$ of the housing 2. The CPU recognizes that the side plate front half part $2c_1$ collides against the obstacle based on an output signal from the obstacle contact sensor 14C.

Each floor surface detection sensor 18 detects high difference of a step whose height is to be avoided by the traveling of the self-propelled vacuum cleaner 1, such as descending stairs.

The CPU is responsive to the output signals from the obstacle detection unit 14 for detecting a position where the obstacle and the step exist. Based on position information of the detected obstacle and step, a next traveling direction by avoiding the detected obstacle and step is decided. In the case where the front floor surface detection sensor 18 fails to detect the step or is broken down, the left floor surface detection sensor and the right floor surface detection sensor 18 are provided for detecting the descending stairs to prevent that the self-propelled vacuum cleaner 1 is fallen down into the descending stairs.

The jyro sensor 20 is provided for affording traveling directional information to the travel control unit 11a while the self-propelled vacuum cleaner 1 travels.

The left wheel drive motor 21L rotates or stops the left drive wheel 22L, whereas the right wheel drive motor 21R rotates or stops the right drive wheel 22R. By configuring the left wheel drive motor 21L and the right wheel drive motor 21R such that they can independently rotate in a positive and reverse direction, the self-propelled vacuum cleaner 1 can implement traveling conditions such as a forward movement, a backward movement, a turn (i.e. change of direction), and acceleration/deceleration.

When the right drive wheel 22R and the left drive wheel 22L are rotated in a positive direction of the same direction, the travel control unit 11a causes the self-propelled vacuum cleaner 1 to travel in a forward position in which the center of the ultrasonic wave receiving unit 14A is positioned. When the right drive wheel 22R and the left drive wheel 22L are rotated in a reverse direction of the same direction, the travel control unit 11a causes the self-propelled vacuum cleaner 1 to travel in a backward position. When the right drive wheel 22R and the left drive wheel 22L are rotated in a reverse direction at a different speed, the travel control unit 11a causes the self-propelled vacuum cleaner 1 to turn. A different speed of the right drive wheel 22R and the left drive wheel 22L includes a case of stopping one of the drive wheels.

For example, when the travel control unit 11a detects that the self-propelled vacuum cleaner 1 reaches to a peripheral end of a cleaning area using each sensor in the obstacle detection unit 14, the right drive wheel 22R and the left drive wheel 22L are decelerated and then stopped. Thereafter, the right drive wheel 22R and the left drive wheel 22L are rotated in a reverse direction, the self-propelled vacuum cleaner 1 is caused to turn at 90°. Then, when it travels at a distance approximately equal to the opening width of the suction port 31, the self-propelled vacuum cleaner 1 is caused to further turn at 90°, so that it is caused to travels in a direction reverse to the previous traveling course. The self-propelled vacuum cleaner 1 repeats the turning described above by zigzag to travel in a zigzag shape, it controls to clean all over the cleaning area.

When the obstacle detection unit 14 detects an obstacle on a traveling course, the travel control unit 11a causes the self-propelled vacuum cleaner 1 to decelerate or stop and then turn, so that it changes the traveling direction so as to avoid the obstacle. When it travels up to such a distance that the obstacle cannot be detected, the travel control unit 11a causes the self-propelled vacuum cleaner 1 to turn to a direction in which the self-propelled vacuum cleaner 1 approaches to an extension line of the original course, and, then, continues traveling. When anyone of the floor surface detection sensors 18 does not detect a floor surface, the travel control unit 11a causes the self-propelled vacuum cleaner 1 to stop temporarily and travel backward, and, then, turn, so that it does not fall down from a step of stairs etc. in order to perform avoidance traveling control. Thus, the travel control unit 11a causes the self-propelled vacuum cleaner 1 to travel, while avoiding the obstacle, all over the place where the self-propelled vacuum cleaner 1 is placed or a desired area.

In this embodiment, the forward direction means a forward direction of the self-propelled vacuum cleaner 1, i.e., the direction from the rear wheel 26 to the suction port 31 in FIG. 3. The backward direction means a backward direction of the self-propelled vacuum cleaner 1, i.e., the direction from the suction port 31 to the rear wheel 26 in FIG. 3.

The navigation signal receiving unit 24 is an infrared sensor for receiving infrared rays and is disposed in front of the housing 2. The navigation signal receiving unit 24 receives position indicator signals (beacons) etc. emitted from a navigation signal sending unit 203 of a charging stand 201 as a docking station.

In the control unit 11, the navigation signal receiving unit 24 receives signals emitted from the navigation signal sending unit 203 of the charging stand 201 to recognize a direction in which the charging stand 201 exists. The travel control unit 11a causes the self-propelled vacuum cleaner 1 to travel to the direction in which the charging stand 201 exist, so that the self-propelled vacuum cleaner 1 is caused to be back to the charging stand 201, when the cleaning has been finished, a battery of the rechargeable battery 12 has been little, or a period of a predetermined cleaning time has been passed. If there is an obstacle, the travel control unit 11a causes the self-propelled vacuum cleaner 1 to avoid the obstacle and to move to the direction of the charging stand 201.

The notification unit 55 is provided for informing a state of the self-propelled vacuum cleaner 1 to the user. In this embodiment, the notification unit 55 includes a sound output circuit and a speaker for outputting sound. In another embodiment, a display unit using a LED lamp or the like may be provided on the upper portion of the housing 2, more specifically, on the top plate front part $2b_1$ and the side plate rear half part $2c_2$. Further, in another embodiment, a communication unit such as a wireless LAN for sending information to an information processing device having a communication function of a smart phone owned by the user may be provided.

The charging stand 201 includes a charging terminal unit 202 and the navigation signal sending unit 203. The charging terminal unit 202 of the charging stand 201 is electrically contacted with the charging connecting unit 13 of the self-propelled vacuum cleaner 1, so that the self-propelled vacuum cleaner 1 receives power supply from the charging stand 201, and the rechargeable battery 12 of the self-propelled vacuum cleaner 1 is charged.

The navigation signal sending unit 203 includes a signal generation circuit for generating beacon signals, and a LED for emitting the generated infrared photo signals.

<<Drive Wheel Unit and its Attachment Structure>>

Since the left drive wheel unit 23L and the right drive wheel unit 23R are symmetrical and form a pair, they are referred to as a drive wheel unit 23, collectively. Further, if one mechanism is explained, the other mechanism is symmetrical to one mechanism and may be obvious. Therefore, in the following explanation of the drive wheel unit 23, the left drive wheel unit 23L is representatively explained, and the explanation of the right drive wheel unit 23R is omitted. In the following explanation, the distinction of the left and the right as to the name and the reference figure of each unit or part may be omitted.

FIG. 6 is a vertical sectional view, taken along a longitudinal direction, of a portion including the left drive wheel unit 23L in the self-propelled vacuum cleaner 1 illustrated in FIG. 2.

Figure 9:
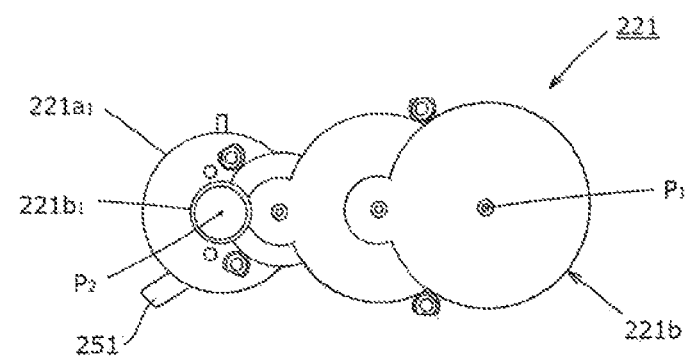
FIG. 9 is an explanatory view, from an external side, of a drive wheel holder included in the drive wheel unit according to one embodiment of the present invention.
Figure 10:
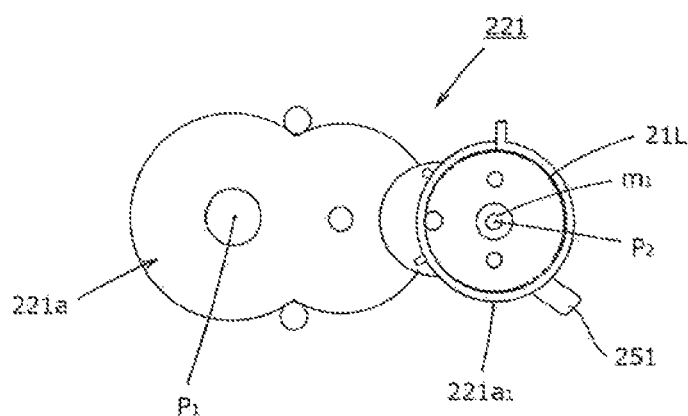
FIG. 10 is an explanatory view, from an internal side, of the drive wheel holder illustrated in FIG. 9.
Figure 11:
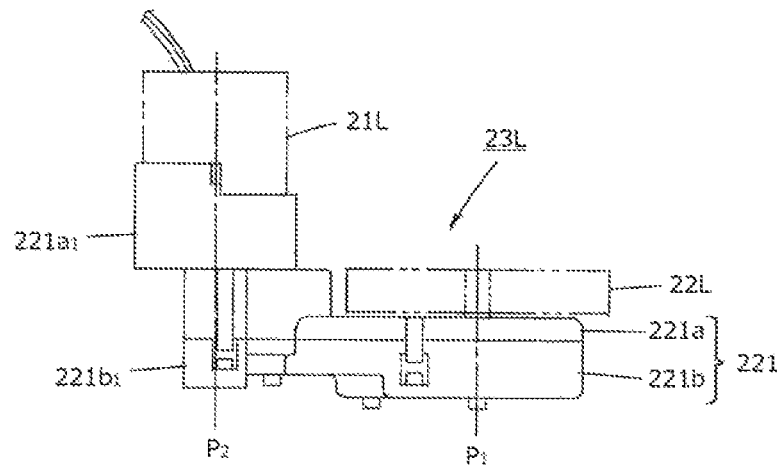
FIG. 11 is an explanatory view, from above, of a drive wheel holder according to one embodiment of the present invention.
Figure 12:
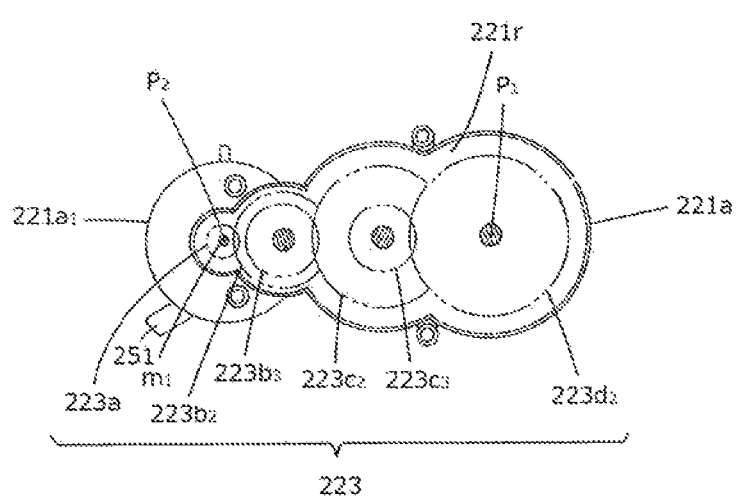
FIG. 12 is an explanatory view illustrating an internal mechanism of the drive wheel holder illustrated in FIG. 9.

FIGS. 7A and 7B are explanatory views illustrating a state in which the drive wheel unit 23 of the self-propelled electronic device 1 is displaced relative to the housing 2 in the vertical direction according to one embodiment of the present invention. FIGS. 8A and 8B are other explanatory views illustrating the state in which the drive wheel unit 23 of the self-propelled electronic device 1 is displaced relative to the housing 2 in the vertical direction. FIG. 9 is an explanatory view, from an external side of the self-propelled electronic device 1, of a drive wheel holder 221, included in the drive wheel unit 23, as a suspension unit for swing (displacing) up and down relative to the housing 2. In contrast, FIG. 10 is an explanatory view, from an internal side, of the drive wheel holder 221. FIG. 11 is an explanatory view, from above, of the left drive wheel motor 21L, the left drive wheel 22L and the drive wheel holder 221 included in the left drive wheel unit 23L. FIG. 12 is an explanatory view illustrating an internal mechanism of the drive wheel holder illustrated in FIG. 9. Although FIGS. 7A-12 illustrate only the left drive wheel unit 23L, the right drive wheel unit 23R is symmetrical with the left drive wheel unit 23L.

The drive wheel unit 23 has the left drive wheel 22L, the drive wheel holder 221, the left drive wheel motor 21L, and a drive transmission mechanism 223. The drive wheel holder 221 is provided for sustaining the left drive wheel 22L, rotatably, around a first axis $P_1$ of the lateral direction. The left drive wheel motor 21L is disposed on the drive wheel holder 221. The drive transmission mechanism 223 is provided for transmitting the driving force of the left drive wheel motor 21L to the left drive wheel 22L.

The drive wheel holder 221 has an inner case unit 221a and an outer case unit 221b each having a boss portion to be connected rotatably by screws at a plurality of positions of the outer peripheral portion. In the inside, as the drive transmission mechanism 223, a gear accommodation chamber 221r is provided for accommodating a first gear 223a, a second gear $223b_2$, a third gear $223b3$, a fourth gear $223c_2$, a fifth gear $223c_3$ and a sixth gear $223d_2$. The drive wheel holder 221 has a cylindrical unit $221a_1$ for fitting the left drive wheel motor 21L into the inner case unit 221a.

The cylindrical unit $221a_1$ is disposed on an end (the front end) in the longitudinal direction of the inner case unit 221a, to whose position the left drive wheel motor 21L is fitted and fixed. As corresponding to the cylindrical unit $221a_1$ of the inner case unit 221a, a cylindrical unit 221b1 is formed in the outer case unit $221_b$. An end of a spring, as a biasing member 241, is hooked to the upper portion of the outer peripheral portion of the cylindrical unit $221a_1$. In addition, the first axis $P_1$ of the sixth gear $223d_2$ and a second axis $P_2$ of the first gear 223a are in parallel. That is, an axis of the left drive wheel 22L and a drive shaft $m_1$ of the left drive wheel motor 21L are in parallel.

Driving force of the drive shaft $m_1$ of the left drive wheel motor 21L is transmitted to the sixth gear $223d_2$ via the first gear 223a to the fifth gear $223c_3$. The sixth gear $223d_2$ is coupled with the left drive wheel 22L so as to be rotated in unison. Thereby, the driving force of the left drive wheel motor 21L is transmitted to the left drive wheel 22L.

As illustrated in FIGS. 7A and 8A, the self-propelled vacuum cleaner 1 is supported above a floor surface F by the left drive wheel and the right drive wheel via a support member 231 and the drive wheel holder 221 coupled to the bottom plate 2a. In this time, since the weight of the housing 2 is loaded on the drive wheel unit 23, the drive wheel holder 221 is swung (displaced) around the second axis $P_2$ as a rotation shaft of the cylindrical units $221a_1$ and $221b_1$, so that majority parts of the left drive wheel 22L are housed into the support member 231. At the same time, the front end of the biasing member 241 is moved in the direction of being pulled forward.

As illustrated in FIGS. 9 and 10, a light shielding plate 251 is formed in the outer case unit 221b. When the drive wheel holder 221 is swung around the cylindrical units $221a_1$ and $221b_1$, the light shielding plate 251 is replaced relative to the housing 2 in accordance with the swing. As illustrated in FIG. 8, when the left drive wheel 22L is swung to a direction to be housed into the support member 231, the light shielding plate 251 is replaced downward (i.e. a direction of approaching to the bottom plate 2a). A left drive wheel sensor 253L and a right drive wheel sensor 253R are disposed in the housing 2. Being similar to the drive wheel unit, the distinction of the left and the right is omitted in the following explanation. In this embodiment, a drive wheel sensor 253 is a transparent-type photo sensor (referred to as a photo interrupter) in which a pair of a light receiving part and a light emission part are opposed via a slit. When the light shielding plate 251, which is swung in unison with the drive wheel holder 221, is inserted between the light receiving part and the light emission part to thereby be in a position to block the slit, the light from the light emission part to the light receiving part is blocked by the slit. The photo sensor senses such a change. As illustrated in FIG. 8, while the self-propelled vacuum cleaner 1 travels on the flat floor surface, so that the left drive wheel $22_1$ is housed to the support member 231, the light shielding plate 251 is in a position deviated from the slit.

As illustrated in FIGS. 7B and 8B, when the housing 2 is lifted up relative to the floor surface F from the above state, the front end of the biasing member 241 is pulled backward. Further, as the rotation shaft of the cylindrical unit $221a_1$ and $221b_1$, the drive wheel unit 23 is swung around the second axis $P_2$ and the left drive wheel 22L is protruded into the outside of the support member 231.

In addition, when the left drive wheel 22L is protruded into the outside of the support member 231, the light shielding plate 251 is displaced upward (a direction to be away from the bottom plate). When the left drive wheel 22L is protruded into a predetermined position (reference position), the light shielding plate 251 blocks the slit of the drive wheel sensor 253.

Thus, the drive wheel sensor 253 detects the vertical displacement of the left and right drive wheels, respectively.

Embodiment 1

In this embodiment, when the drive wheel is lifted up a reference, the travel control unit 11a does not perform avoidance traveling control, uniformly, but, refers to the detection result of the floor surface sensor. In the case where the distance up to the floor surface is longer than a predetermined reference distance, the travel control unit 11a is controlled to perform avoidance traveling control. On the other hand, in the case where the distance up to the floor surface is a predetermined reference distance or shorter, the travel control unit 11a is controlled not to perform avoidance traveling control and to continue traveling.

Figure 13:
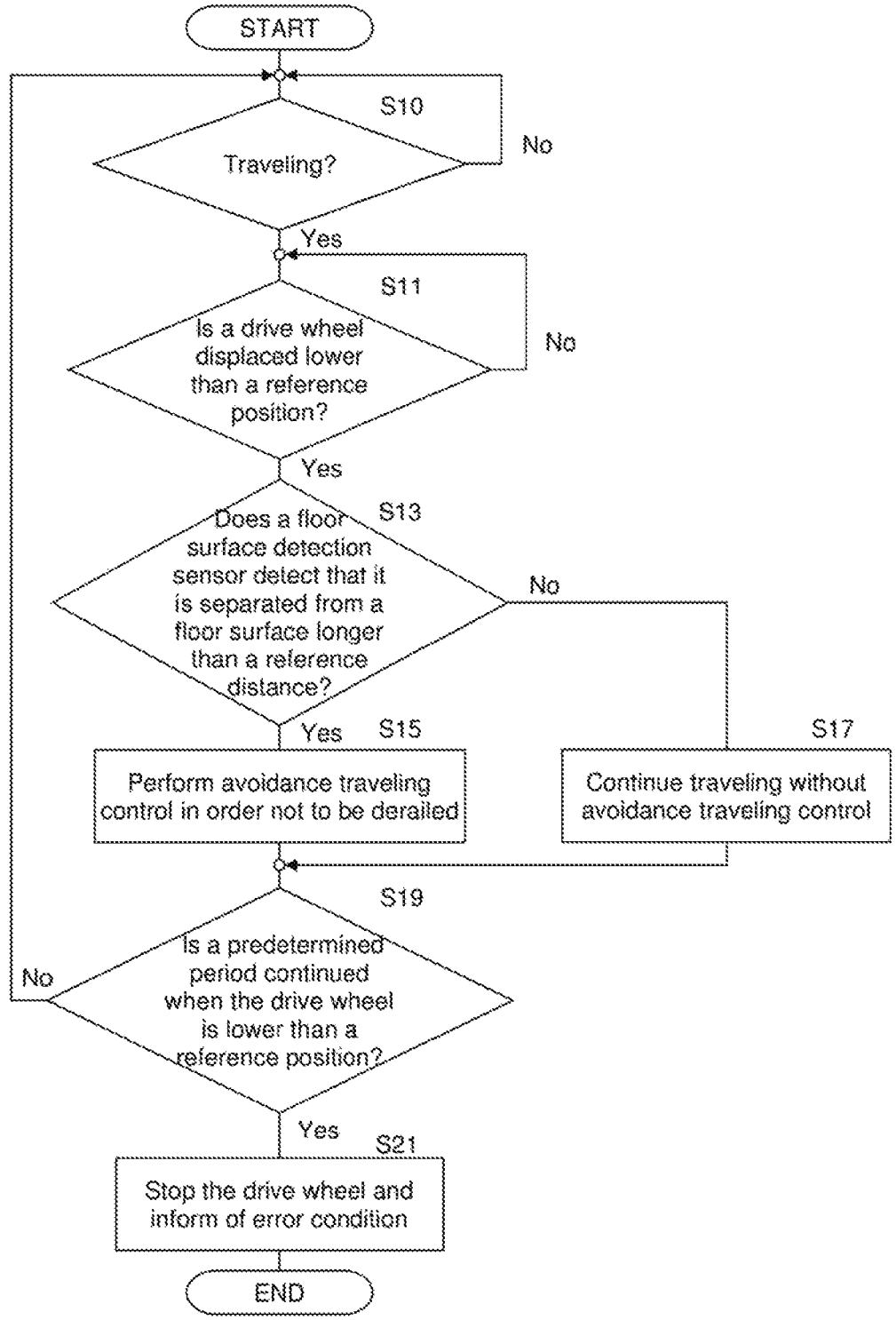
FIG. 13 is a flowchart illustrating a travel control, executed by a travel control unit, for avoiding derailing of a drive wheel according to one embodiment of the present invention (Embodiment 1).

FIG. 13 is a flowchart illustrating a travel control, executed by the travel control unit 11a, for avoiding derailing of the drive wheel.

FIGS. 14A to 14C are explanatory views illustrating states in which the self-propelled vacuum cleaner 1 enters a step ST, over whose height the self-propelled vacuum cleaner 1 can ride, from an oblique direction according to this embodiment of the present invention. Besides, in FIGS. 14A to 14C, the step ST is assumed that its front side of the course of the self-propelled vacuum cleaner 1 is higher than the backside. Further, the left drive wheel 22L and the right drive wheel 22R are described by a chain line for easy understanding.

Figure 15A:
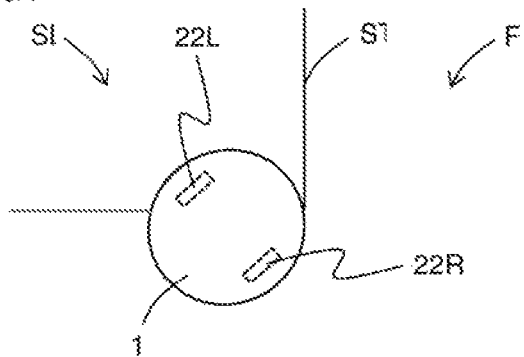
FIG. 15A is an explanatory view illustrating a state in which a left drive wheel of a self-propelled vacuum cleaner enters a downward slope and a right drive wheel thereof travels on a flat floor surface according to one embodiment of the present invention (Embodiment 1).
Figure 15B:
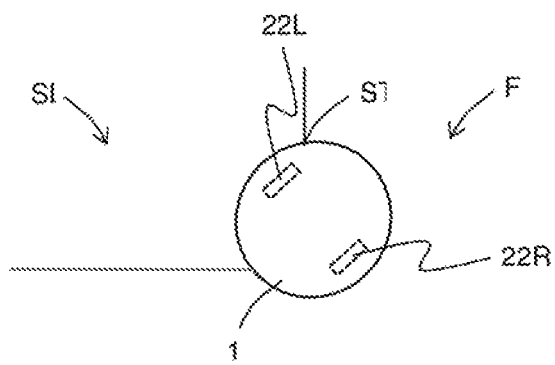
FIG. 15B is an explanatory view illustrating a state in which a left drive wheel of a self-propelled vacuum cleaner enters a slope and approaches a step between a slope and a floor surface according to one embodiment of the present invention (Embodiment 1).
Figure 15C:
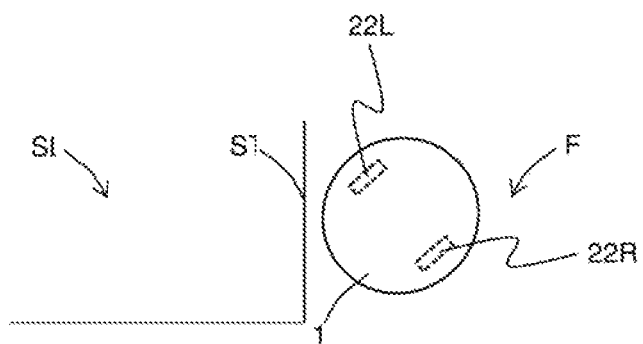
FIG. 15C is an explanatory view illustrating a state in which a self-propelled vacuum cleaner passes a step between a slope and a floor surface according to one embodiment of the present invention (Embodiment 1).

FIGS. 15A to 15C are explanatory views illustrating states in which the left drive wheel 22L of the self-propelled vacuum cleaner 1 enters a loose downward slope SL and the right drive wheel 22R travels on a flat floor surface F without a slope according to this embodiment of the present invention. Besides, in FIGS. 15A to 15C, the step ST exists in a boundary between the slope SL and the floor surface F. The step ST is assumed that its height is raised from the front side of the course of the self-propelled vacuum cleaner 1 to the backside.

As illustrated in FIG. 13, while the self-propelled vacuum cleaner 1 travels (YES in step S10), the travel control unit 11a successively monitors whether anyone of the left drive wheel 22L and the right drive wheel 22R is lifted up the reference position (step S11). Here, the cases where the self-propelled vacuum cleaner 1 stops temporarily to avoid an obstacle, or the self-propelled vacuum cleaner 1 cannot travel because the drive wheel cannot be driven by slipping with the floor surface are included during the traveling. However, it is not during the traveling after the self-propelled vacuum cleaner 1 autonomously ends the travel including the case where it is returned to the charging stand 201 or the like. In FIGS. 14A and 15A, the left drive wheel 22L and the right drive wheel 22R are not lifted up, but grip the floor surface. In this case, the determination at step S11 is NO, so that the travel control unit 11a continues to monitor the drive wheel.

In FIG. 14A, if the ridge line of the step ST comes in contact with the bottom plate 2a of the self-propelled vacuum cleaner 1 under the condition that the left drive wheel 22L rides over the step ST, and the right drive wheel 22R is in front of the step ST, the left drive wheel 22L is lifted up. This is because the center of gravity of the self-propelled vacuum cleaner 1 is shifted to the rear having the rechargeable battery 12. When the drive wheel sensor 253 of the left drive wheel 22L detects this lifting, the determination at step S11 of FIG. 13 becomes YES.

In FIG. 15B, when the left drive wheel 22L is down the slope SL and the right drive wheel 22R continues to travel on the flat floor surface, at last, the ridge line of the step ST comes in contact with the bottom plate 2a of the self-propelled vacuum cleaner 1, so that the right drive wheel 22R is lifted up. When the drive wheel sensor 253 of the right drive wheel 22R detects this lifting, the determination at step S11 of FIG. 13 becomes YES.

When the drive wheel sensor 253 of the right drive wheel 22R detects the lifting during traveling, the travel control unit 11a refers to the floor surface detection sensor at a position corresponding to the drive wheel whose lifting is detected (step S13). For example, in the case of FIG. 14B, the travel control unit 11a refers to the floor surface detection sensor 18 positioned at the axial position of the side brush 10 at the left side in the forward of the left drive wheel 22L. In the case of FIG. 15B, it refers to the floor surface detection sensor 18 positioned at the axial position of the side brush 10 at the right side in the forward of the right drive wheel 22R.

When the floor surface detection sensor 18 in question detects that a distance of the floor surface is away from the reference distance (Yes at step S13 in FIG. 13), the travel control unit 11a detects that the step is a step over whose height the self-propelled vacuum cleaner 1 cannot ride. Accordingly, avoidance traveling control is started in order for the self-propelled vacuum cleaner 1 not to be derailed (step S15). Thereafter, the routine proceeds to step S19.

In an example of avoidance traveling control, the self-propelled vacuum cleaner 1 is stopped and back at a predetermined distance; subsequently, after the self-propelled vacuum cleaner 1 is turned at a predetermined angle, preferably, from 90 to 180° (e.g., 90°), it is forwarded. Here, it is preferable that the turning direction is a direction opposite to the direction of the drive wheel which is detected to be in lifting. For example, in the case of FIG. 14B, since the left drive wheel 22L is detected to be lifted up, the self-propelled vacuum cleaner 1 is turned rightward. In the case of FIG. 15B, since the right drive wheel 22R is detected to be lifted up, the self-propelled vacuum cleaner 1 is turned leftward. Thus, when either one of the left drive wheel 22L and the right drive wheel 22R rides over the step ST, but, the other of them does not ride over the step ST, the drive wheel which has ridden over the step ST is returned by performing a change of direction, thereby avoiding the traveling control of the step ST, so that it continues traveling.

In addition, while the backward movement and the change of direction turn are performed, the floor surface detection sensor of the rear detects that the floor surface is far away from more than the reference distance, so that the self-propelled vacuum cleaner 1 may be temporarily stopped, and may be caused to perform the forward movement instead of the backward movement, unlike the pattern of the avoidance traveling control.

On the other hand, in the step S13, when the floor surface detection sensor 18 in question detects that the distance of the floor surface is the reference distance or shorter (No at step S13 in FIG. 13), the travel control unit 11a detects that the step is a step over whose height the self-propelled vacuum cleaner 1 can ride. Accordingly, avoidance traveling control is not performed and the self-propelled vacuum cleaner 1 continues traveling (step S17). Thereafter, the routine proceeds to step S19.

Even if either one of the left drive wheel 22L and the right drive wheel 22R is lifted momentarily, driving force is obtained to some extent as long as the drive wheel comes in contact with the floor surface. With the help of inertia of the self-propelled vacuum cleaner 1, and thrust including the driving force of the driving wheel which is not lifted up, there is a strong likelihood that the self-propelled vacuum cleaner 1 can travel by riding over the step ST (see, FIGS. 14A and 15C).

The travel control unit 11a determines whether or not a predetermined period has passed from a time when the position of the drive wheel is displaced to be lower than a predetermined reference position. If the period has not passed yet (No at step S19), the routine is returned to step S10 to continue to monitor the drive wheel sensor.

If the period has passed (Yes at step S19), the travel control unit 11a determines that the drive wheel is lifted up, slipped, and stuck in a condition of not being capable to travel, the traveling is stopped and the user is informed of this error condition (step S21). Thereafter, the process ends.

Embodiment 2

In the step S13 of FIG. 13A described in Embodiment 1, the travel control unit refers to the floor surface detection sensor 18 whose position corresponds to the drive wheel whose lift is detected, it may be possible for it to refer to another floor surface detection sensor 18, further. For example, said another floor surface detection sensor 18 may be a floor surface detection sensor 18 positioned at the front end or the rear end which does not correspond to the position of the drive wheel. Further, a floor surface detection sensor 18 may be included which corresponds to the position of the drive wheel whose lift is not detected.

Only if, being inclusive of other floor surface detection sensors, the distance of every floor surface detection sensor 18 is the reference distance or shorter, to the floor surface, the avoidance traveling control may not be performed, and the traveling may be continued. Then, it can be determined that the step has such a degree of a height over which the self-propelled vacuum cleaner 1 can ride.

Otherwise, if, being inclusive of other floor surface detection sensors, either one of the floor surface detection sensor 18 detects that the distance to the floor surface is longer than the reference distance, the avoidance traveling control may be performed. Then, the height of the step can be detected, more assuredly.

In addition, if a plurality of floor surface detection sensors detect simultaneously that the distance to the floor surface is longer than the reference distance, the self-propelled vacuum cleaner 1 is stopped immediately without performing avoidance traveling control. This is because it is considered that the body may be stuck in a risk since it is not a flat floor.

Embodiment 3

In Embodiment 1, although the number of the drive wheels is two at the left side and the right side, the essence of the present invention is not limited to this, and the drive wheel may be one, two or more.

In a structure that the drive wheel is one, in place of the left drive wheel 22L and the right drive wheel 22R of the self-propelled vacuum cleaner 1 as shown in FIG. 3, for example, a follower wheel is arranged at their position. Further, in place of the rear wheel 26, a drive wheel with a suspension mechanism is arranged at its position. In such a structure, the change of direction of the housing 2 may be realized, for example, by changing the direction of the drive wheel which is positioned at the position of the rear wheel 26. Or, it may be realized by changing the direction of a left follower wheel and a right follower wheel. The left drive wheel and the right drive wheel may have a suspension mechanism. Detection of the lift of the drive wheel is deeply related to whether or not the drive wheel can grip the floor and obtain driving force.

In this case, the floor surface detection sensor 18 corresponding to the position of the drive wheel may be used by the floor surface detection sensor at the rear end.

In a structure that the drive wheel is two or more, in place of the rear wheel 26 of the self-propelled vacuum cleaner 1 as shown in FIG. 3, for example, a drive wheel with a suspension mechanism is arranged at its position. In place of the left drive wheel 22L and the right drive wheel 22R, the drive wheel is arranged at the rear end. In this case, the change of direction of the housing 2 may be realized, for example, by stopping the driving of the drive wheel positioned at the position of the rear wheel 26 during the change of direction, thereby acting as a follower wheel. Or, it may be realized by changing a speed and driving force of the drive wheel at the rear end in accordance with the speed and the direction of the left follower wheel and the right follower wheel.

Embodiment 4

Another embodiment in respect to the avoidance traveling control for continuing the traveling by avoiding an obstacle and will be described below.

Figure 16A:
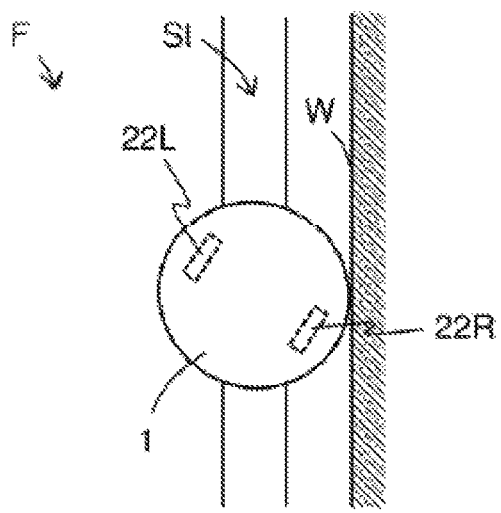
FIG. 16A is an explanatory view illustrating a state in which a self-propelled vacuum cleaner becomes in contact with an obstacle under a down slope, viewing from above according to one embodiment of the present invention (Embodiment 4).
Figure 16B:
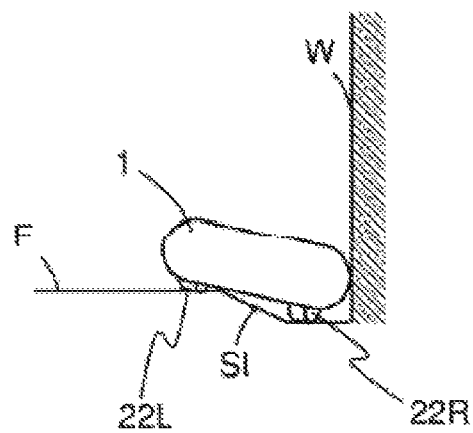
FIG. 16B is an explanatory view illustrating a state in which a self-propelled vacuum cleaner becomes in contact with an obstacle under a down slope, viewing from a side according to one embodiment of the present invention (Embodiment 4).

FIGS. 16A and 16B are explanatory views illustrating states in which a self-propelled vacuum cleaner becomes in contact with an obstacle under a down slope, viewing from above and a side, respectively, according to this embodiment of the present invention.

As illustrated in FIGS. 16A and 16B, in a floor surface F, on which a self-propelled vacuum cleaner 1 travels, there is a side wall W at an end. A slope SL is formed in the vicinity of the side wall W. The floor surface F is gradually down toward the side wall W.

When an ultrasonic wave receiving unit 14A detects the side wall W, the self-propelled vacuum cleaner 1 attempts to be decelerated in front of the side wall W and to change the direction. However, the deceleration is too late with momentum during descending the slope SL. In some cases, as a bumper, a side plate front half part $2c_1$ may come in contact with the side wall W. FIGS. 16A and 16B illustrate such a state.

When the side plate front half part $2c_1$ comes in contact with the side wall W, an obstacle contact sensor 14C detects such a contact with the obstacle.

A travel control unit 11*a* is responsive to the detection of the contact with the obstacle for starting avoidance traveling control in order to continue the traveling by separating from the contacted obstacle. The avoidance traveling control may be similar to the avoidance traveling control as shown in step S15 of FIG. 13. That is, when an obstacle contact sensor 14C detects the contact with the obstacle, the travel control unit 11*a* causes a self-propelled vacuum cleaner 1 to stop and move backward. As the self-propelled vacuum cleaner 1 moves backward, the contact with the obstacle is not detected. Subsequently, the travel control unit 11*a* causes the housing to turn at a predetermined angle (e.g. 90°) and it is forwarded in this direction. Here, the obstacle contact sensor 14C may detect whether the left side of the side plate front half part $2c_1$ comes in contact with the obstacle or the right side of the side plate front half part $2c_1$ comes in contact with the obstacle. To realize such a detection is disclosed in Japanese Unexamined Patent Application Publication No. 2014-137694, for example. In such a case, the travel control unit 11*a* may cause the housing to turn in a direction reverse to a side of contacting with the obstacle. Thus, depending on the detection whether either of the left side and the right side comes in contact with the obstacle, a turning direction is changed, so that the obstacle can be avoided, smoothly without repeating the contact with the obstacle.

In FIGS. 16A and 16B, the right drive wheel 22R is slightly lifted up because of the slope SL on the floor surface F. However, it is not always that the right drive wheel 22R is lifted to the extent that the right drive wheel sensor 253R detects the lift of the right drive wheel 22R. Further, a ridge line of a slope SL is in contact with a part of a bottom plate 2*a*.

Even if, at this state, the above-mentioned avoidance traveling control is started and the self-propelled vacuum cleaner 1 is intended to move backward, the drive wheel cannot grip the floor, enough, but slips, so that the self-propelled vacuum cleaner 1 cannot move backward. Then, even if it is intended to move backward, the detection that the self-propelled vacuum cleaner 1 is in contact with an obstacle will last. When the detection of the contact with the obstacle is continued over a predetermined period from the start of the backward movement, the travel control unit 11*a* may control to stop the drive wheel and inform the user of this error condition. This is because the floor surface is not damaged.

However, in this embodiment, before the drive wheel is stopped and the user is informed of the error condition, the travel control unit 11*a* attempts to separate from the obstacle by performing avoidance traveling control as described below.

Figure 17:
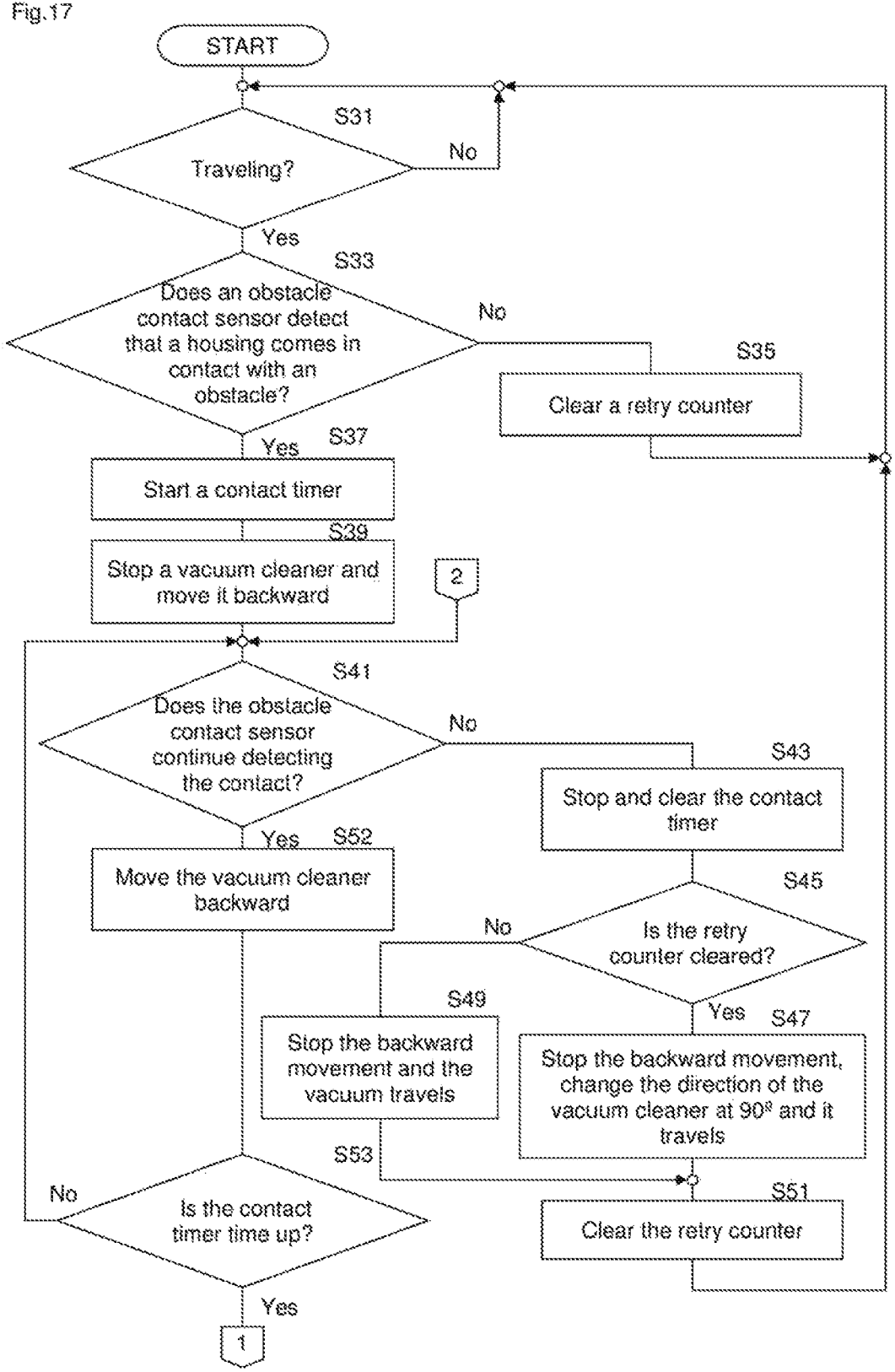
FIG. 17 is a flowchart illustrating a travel control, executed by a travel control unit, up to avoidance travel operation for separating from a contacted obstacle according to one embodiment of the present invention (Embodiment 4).
Figure 18:
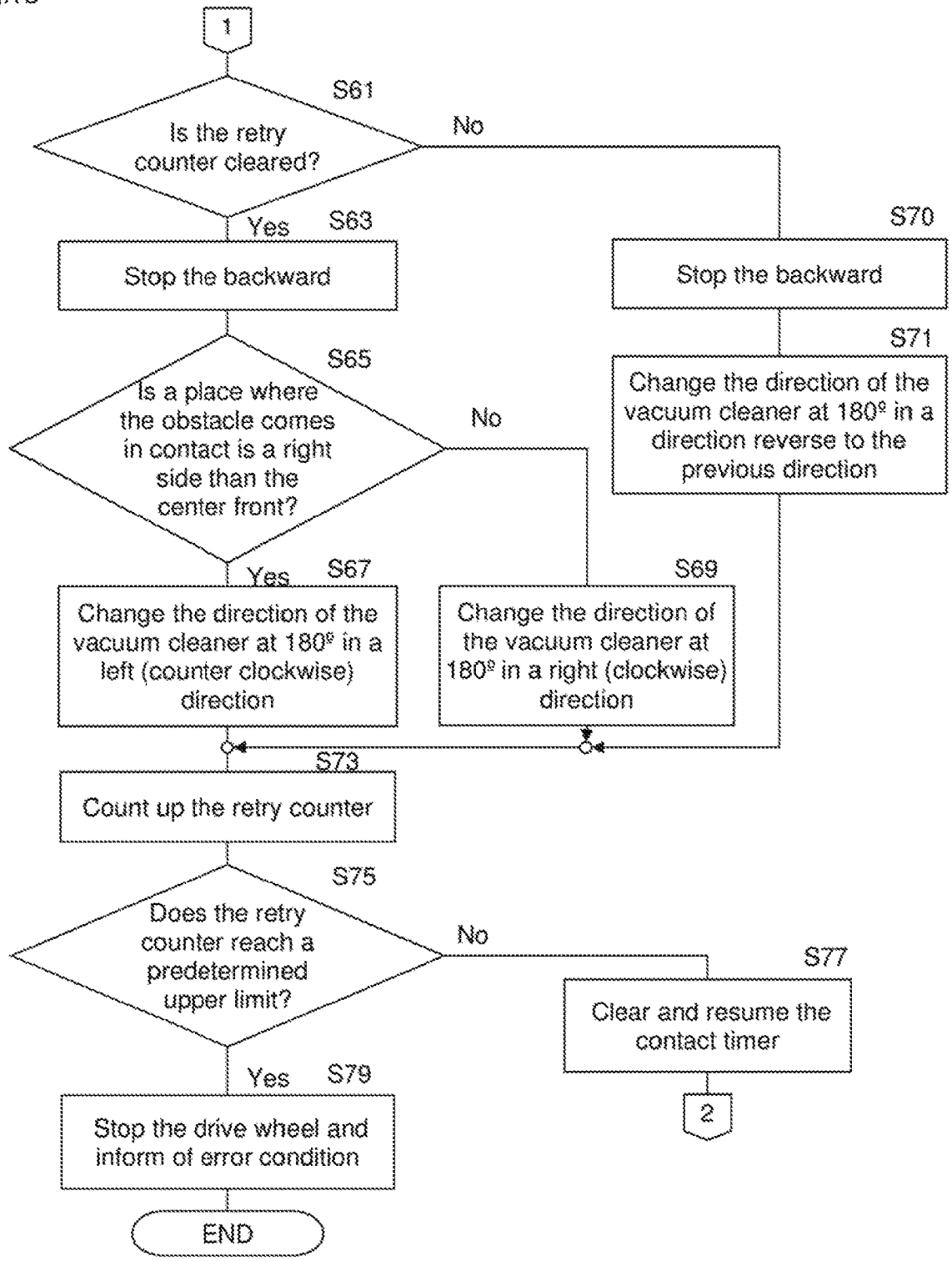
FIG. 18 is a flowchart illustrating a travel control, executed by a travel control unit, for controlling avoidance travel operation to separate from a contacted obstacle according to one embodiment of the present invention (Embodiment 4).

FIGS. 17 and 18 are flowcharts illustrating avoidance travel control, executed by the travel control unit 11*a*, for separating from a contacted obstacle according to this embodiment of the present invention.

As illustrated in FIG. 17, the control unit 11 successively monitors (step S33) whether the obstacle contact sensor 14C detects the contact with the obstacle, while the self-propelled vacuum cleaner 1 travels (Yes in step S31). In this explanation, it is assumed that the obstacle contact sensor 14C can detect whether the obstacle comes in contact with the left side of a bumper or the right side thereof. When the obstacle contact sensor 14C does not detect the contact with the obstacle (No in step S33), a retry counter is cleared (step S35). Thereafter, the routine is returned to step S31 in which the monitoring of the obstacle contact sensor 14C is continued. Here, the retry counter is a counter for counting the number of retrying avoidance traveling operation in a state of detecting the contact with the obstacle.

In step S33, when the obstacle contact sensor 14C, which has not detected the contact with the obstacle, detects the contact with the obstacle (Yes in step S33), the travel control unit 11*a* starts a contact timer (step S37). Then, the travel control unit 11*a* causes the self-propelled vacuum cleaner 1 to temporarily stop and, then, move backward (step S39). The contact timer is a timer for measuring a period when the obstacle contact sensor 14C continues to detect the contact with the obstacle.

Then, the travel control unit 11*a* determines whether or not the obstacle contact sensor 14C continues to detect the contact with the obstacle (step S41). When the contact with the obstacle is not detected (No in step S41), the travel control unit 11*a* clears the contact timer and stops it (step S43). The travel control unit 11*a* checks whether or not the retry counter is cleared (step S45). If the retry counter is cleared and zero, namely, the obstacle contact sensor 14C detects new contact with an obstacle (Yes in step S45), the travel control unit 11*a* stops the backward movement which has been started in the above step S37. Then, the self-propelled vacuum cleaner 1 is caused to change the direction and to travel in a new direction (step S47). By way of example, the angle of the change of direction in step S47 is 90°, but it is not limited thereto. A predetermined angle within a range, for example, from 90 to 180° may be possible. Preferably, the change of direction may be opposed to a left direction or a right direction of detecting the contact with the obstacle. Thereafter, the routine proceeds to step S51 as described below. Besides, the above angle of 90° is a turning angle, assuming that the drive wheel does not slip.

If it slips, the actual turning angle of the self-propelled vacuum cleaner 1 is smaller than 90°.

In step S45, when the retry counter is not cleared (No in step S45), the travel control unit 11*a* causes the self-propelled vacuum cleaner 1 to stop the backward movement, and to travel in the present direction (step S49). A state, where step S45 is proceeded under the condition that the retry counter is cleared, means a state where a turning operation is carried out under the condition that the obstacle contact sensor 14C detects contact with an obstacle whereby the contact is not detected. Since there is a strong likelihood that, as a result of the turning operation, the self-propelled vacuum cleaner 1 is directed in a direction without any obstacle, the self-propelled vacuum cleaner 1 is caused to travel in the direction.

Then, the travel control unit 11*a* clears the retry counter used in the determination in the step S45 (step S51). Thereafter, the routine is returned to step S31 in which the monitoring of the obstacle contact sensor 14C is continued.

Back to the determination in the step S41, the explanation is as follows. While the obstacle contact sensor 14C continues to detect the contact with the obstacle (Yes in step S41), the travel control unit 11*a* causes the self-propelled vacuum cleaner 1 to move backward (step S52). When it has moved backward through the step S39, the backward movement is continued. The travel control unit 11*a* checks whether or not a predetermined period has passed by referring to the contact timer (step S53). When the predetermined period has not passed, the routine is returned to step S41 in which the monitoring of the obstacle contact sensor 14C is continued. When the obstacle contact sensor 14C detects the contact, the backward movement is continued.

Meanwhile, when the predetermined period has passed, the routine proceeds to step S61 of FIG. 18 in which the avoidance traveling control is started.

In the step S61, the travel control unit 11*a* determines whether or not the retry counter is cleared. The condition that the retry counter is cleared corresponds to a case where it is during from the condition that it has not detected the contact with the obstacle, to the condition that it detects the contact, thereby starting the backward movement in the step S37, and the backward movement is still going on. In this case (Yes in step S61), the travel control unit 11*a* causes the self-propelled vacuum cleaner 1 to stop the backward movement (step S63).

Then, the travel control unit 11*a* determines whether or not the right side of the bumper comes in contact with the obstacle (step S65). If an approximately center area comes in contact with the obstacle, it can be determined that, between the left obstacle contact sensor and the right obstacle contact sensor, the side of either contact sensor's detecting the contact earlier than the other comes in contact with the obstacle. However, it is not limited thereto and it may be possible to determine that the side of either contact sensor's detecting the contact later than the other comes in contact with the obstacle.

When it is determined that the right side comes in contact with the obstacle (Yes step S65), the travel control unit 11*a* causes the self-propelled vacuum cleaner 1 to change the direction in a counter clockwise direction (step S67). When it is determined that the right side does not come in contact with the obstacle (No in step S65), the travel control unit 11*a* causes the self-propelled vacuum cleaner 1 to change the direction in a clockwise direction (step S69). Thus, the self-propelled vacuum cleaner 1 is caused to change the direction in a direction reverse to the direction of detecting the contact with the obstacle.

On the other hand, in the step S61, when the retry counter is not cleared, namely, the avoidance travelling operation has been already controlled, the travel control unit 11*a* causes the self-propelled vacuum cleaner 1 to stop the backward movement (step S70). Then, the travel control unit 11*a* causes the self-propelled vacuum cleaner 1 to change the direction in a direction reverse to the previous change of direction (step S71).

After the avoidance travelling operation is controlled to perform the change of direction for the first time in the step S67, step S69 or step S71, the retry counter is counted up from zero to +1 (step S73).

By way of example, as the angle of the change of direction in the step S67, step S69 and step S71 is 180°, it is set to be greater than the angle of the change of direction in the step S47. This is because it is considered that the change of direction, which is performed under the condition that the contact with the obstacle is detected, is a higher possibility of the drive wheel's slipping than the change of direction which is performed in the step S47 without detecting the contact with the obstacle. Since the angle in the step S47 is not limited to 90°, the angle in the step S67, step S69 and step S71 is not limited to 180°, also. However, because of the above described reason, the angle for the change of direction is, preferably, greater than the angle for the change of direction without detecting the contact with the obstacle. Further, if the contact with the obstacle is not detected during changing the direction at a predetermined angle, the change of direction may be controlled to stop at this time.

Then, the travel control unit 11*a* checks whether or not the retry counter reaches a predetermined upper limit (step S75). By way of example, the upper limit is four (i.e., the value of the retry counter is +4). If the retry counter does not reach the upper limit, in other words, the value of the retry counter is smaller than +5 (No in step S75), the travel control unit 11*a* clears the contact timer and resumes it (step S77). Thereafter, the routine is returned to the step S41 in FIG. 17 in which the monitoring of the obstacle contact sensor 14C is continued. That is, the travel control unit 11*a* checks whether or not the contact with the obstacle is not detected via the avoidance travelling operation in the step S67 or step S69.

If the retry counter reaches the upper limit (Yes in step S75), the travel control unit 11*a* determines that, regardless of repeating the avoidance travelling operation at a predetermined time, the contact is continued. The travel control unit 11*a* stops the drive wheel and informs the user of the error condition (step S79), and ends the process.

The explanation will be described by fitting the control of a series of the avoidance travelling operation described above as illustrated in FIGS. 17 and 18 into the states of FIGS. 16A and 16B. In FIG. 16A, the right side of the bumper is in contact with the side wall W. As there is the slope SL, the self-propelled vacuum cleaner 1 is inclined to the side of the side wall W. If the self-propelled vacuum cleaner 1 attempts to turn for the change of direction, friction force applied to the bumper from the side wall W is a load. Further, because of the slope SL, the left drive wheel 22L and the right drive wheel 22R are slightly lifted up, so that, in particular, the right drive wheel 22R cannot grip the floor surface F, sufficiently. Further, the bottom plate 2*a* of the housing 2 is in contact with the upper end of the slope SL.

Referring to the flowchart of FIG. 17, when the self-propelled vacuum cleaner 1 in traveling comes in contact with the side wall W, the determination in the step S33 is Yes, so that, in the step S37, the travel control unit 11*a* causes the self-propelled vacuum cleaner 1 to move backward. However, the left drive wheel 22L and the right drive wheel 22R slip on the floor surface F, so that sufficient driving force cannot be obtained and it cannot move backward. The obstacle contact sensor 14C continues to detect the contact (a loop following Yes in step S41 and No in step S53). Meantime, when the contact timer becomes a time up (Yes in step S53), the travel control unit 11a causes the self-propelled vacuum cleaner 1 to stop the backward movement (step S63). Then, it causes the self-propelled vacuum cleaner 1 to change the direction in the counter clockwise (step S67).

At the avoidance travelling operation for the first time, the retry counter does not reach the upper limit (No in step S75). Accordingly, the travel control unit 11a clears the contact timer and resumes it (step S77). Then, the routine is returned to step S41 in which the monitoring of the obstacle contact sensor 14C is continued.

Even if the change of direction for the first time has been finished, but the detection of the contact is still continued, the travel control unit 11a causes the self-propelled vacuum cleaner 1 to move backward, again (step S52). When the backward movement is continued and the contact timer becomes a time up (Yes in step S53), the travel control unit 11a stops the backward movement of the self-propelled vacuum cleaner 1 (step S70). The change of direction for the second time is performed in a clockwise direction reverse to the previous direction (step S71). In this case, the value of the retry counter is +1, namely, is not cleared zero (No in step S61). It may be possible that the change of direction for the second time is further performed in the same direction as the direction for the first time. However, in this embodiment, the change of direction for the second time is performed in a direction reverse to the previous direction. This is because this is a high possibility that the change of direction is successful to separate from the obstacle.

After the change of direction, the travel control unit 11a counts up the retry counter from +1 to +2 (step S73). The contact timer is resumed (step S77). Thereafter, the routine is returned to step S41 in which the monitoring of the obstacle contact sensor 14C is continued.

When the detection of the contact is further continued, the travel control unit 11a causes the self-propelled vacuum cleaner 1 to move backward, again. When the backward movement is continued and the contact timer becomes a time up (Yes in step S53), the travel control unit 11a stops the backward movement of the self-propelled vacuum cleaner 1, and the change of direction for the third time is performed in a counter clockwise direction reverse to the previous direction (step S73). Even if the change of direction up to the second time is performed and the contact is still detected, there is a possibility that the change of direction has been slightly performed, and it is considered that the separation from the obstacle is possible by further attempting the change of direction. After the change of direction, the travel control unit 11a counts up the retry counter from +2 to +3 (step S73). The contact timer is resumed (step S77). Thereafter, the routine is returned to step S41 in which the monitoring of the obstacle contact sensor 14C is continued.

When the detection of the contact is still continued, the self-propelled vacuum cleaner 1 is caused to move backward, again. When the backward movement is continued and the contact timer becomes a time up (Yes in step S53), the travel control unit 11a stops the backward movement of the self-propelled vacuum cleaner 1 (step S70). The change of direction for the fourth time is performed in a clockwise direction reverse to the previous direction (step S73). The travel control unit 11a counts up the retry counter from +3 to +4 (step S73). The contact timer is resumed (step S77). Thereafter, the routine is returned to step S41 in which the monitoring of the obstacle contact sensor 14C is continued.

As a result of the change of direction for the fourth time, if the obstacle contact sensor 14C does not detect the contact to the side wall W (No in step S41), the travel control unit 11a causes the self-propelled vacuum cleaner 1 to move in the present direction (step S49). Thereby, the traveling is continued, being separated from the side wall W. This is the same if the contact is not detected at a stage up to the fourth time.

On the other hand, even if the change of direction for the fourth time has been finished, but the detection of the contact is still continued, the travel control unit 11a causes the self-propelled vacuum cleaner 1 to move backward, again. When the backward movement is continued and the contact timer becomes a time up (Yes in step S53), the backward movement of the self-propelled vacuum cleaner 1 is stopped and the change of direction for the fifth time is performed in a clockwise direction reverse to the previous direction (step S73).

The travel control unit 11a counts up the retry counter from +4 to +5 (step S73). It is determined whether or not the retry counter reaches the upper limit, namely, the value of the retry counter is smaller than (step S75). In this case, since the value of the retry counter is +5, but not smaller than +5, it is determined that the upper limit is reached (Yes in step S75). The travel control unit 11a stops the drive wheel and informs the user of the error condition (step S79), and ends the process.

As described above, (i) a self-propelled electronic device according to the present invention is characterized by including: at least one drive wheel disposed at a bottom of a housing, the drive wheel traveling the housing while being displaced in a vertical direction in accordance with undulations of a floor surface; a drive wheel sensor for detecting a position of the drive wheel relative to the housing; a floor detection sensor for detecting a distance between the bottom of the housing and the floor surface; and a travel control unit for determining and deciding a course based on the determination that there exists a step on the floor surface if the distance detected by the floor detection sensor is longer than a predetermined reference distance, or, otherwise, the position of the drive wheel detected by the drive wheel sensor is lower than a predetermined reference position, by successively referring to output of the drive wheel sensor and the floor detection sensor, wherein, if the position of the drive wheel detected by the drive wheel sensor is lower than a predetermined reference position, the travel control unit further refers to the distance detected by the floor detection sensor, and if the distance detected by the floor detection sensor is longer than the predetermined reference distance, the travel control unit performs avoidance traveling control of the housing to avoid the step, and travels the housing, whereas, if the distance detected by the floor detection sensor is the predetermined reference distance or shorter, the travel control unit does not perform the avoidance traveling control of the housing, and continues the traveling of the housing.

In the present invention, a drive wheel is a wheel which is energized by a power source including a motor or the like, and one for traveling a self-propelled electronic device. In this invention, the drive wheel can be displaced in a vertical position in accordance with undulations of a floor surface. In a specific embodiment of the present invention, for example, it may be a suspension mechanism described in a mode of the embodiment of the present invention.

In a preferable embodiment of the present invention, a drive wheel includes a left drive wheel and a right drive wheel. It may be more or less than this.

A drive wheel sensor is provided for detecting a position in a vertical direction. In the present invention, the drive wheel sensor may detect in a binary detection whether the drive wheel is upper or lower than a predetermined reference position. A case where the drive wheel is lower than the predetermined reference position corresponds to a condition that a lift of the drive wheel is greater than a reference. A degree of the lift can be said to be a degree that the drive wheel protrudes downward from the bottom of the housing.

Further, a floor detection sensor is provided for detecting a distance between the bottom of the housing and a floor surface, and for detecting presence and absence of a step based on variations of the detected distance while traveling. A specific embodiment of the floor surface is, for example, a reflection type photo sensor. The floor detection sensor may detect in a binary detection whether the detected distance is greater or smaller than a predetermined reference distance. But, it may be in an equivocal detection in addition to the binary detection. In a preferable embodiment, when there are a drive wheel and a follower wheel, the floor detection sensor detects the floor surface at a forward area of each wheel including the follower wheel. But, it is not limited to this embodiment, and, for example, a plurality of floor detection sensors may be arranged at an outer peripheral of the bottom of the housing, each floor detection sensor may be arranged at the front and the rear of each wheel, or, each floor detection sensor may be arranged corresponding to a part of wheels, for example, such as the follower wheel only.

A travel control unit is provided for controlling the traveling of a self-propelled electronic device. In a specific embodiment of the present invention, the travel control unit is a control circuit having an input/output circuit, implemented mainly by a microcomputer, for receiving detection signals from the drive wheel sensor and the floor surface detection sensor, and for outputting control signals to the power source of the drive wheel.

Preferable embodiments of the present invention will be further described.

(ii) After the position detected by the drive wheel sensor is lower than the predetermined reference position and the travel control unit may determine not to perform avoidance traveling control of the housing, and the travel control unit may stop the drive wheel if the detected position does not changed to be higher than the predetermined reference position after a predetermined time has been passed.

Thereby, in the case where the travel control unit determines that this is a step over whose height the self-propelled electronic device can ride, and the travel control unit causes the self-propelled electronic device to travel, if the lift of the drive wheel is continued over a predetermined period, the travel control unit determines that a slip is caused and the traveling stops, so that the travel control unit stops the drive wheel. Then, it is possible that the idling drive wheel does not damage the floor surface.

(iii) The avoidance traveling control of the housing may be a traveling operation in which the traveling of the housing is temporarily stopped, a backward movement or forward movement of the housing is performed, and, thereafter, a change of direction of the housing is carried out.

Thereby, even if there is a step, for example, in a forward direction of the traveling direction, the traveling can be stopped before reaching the step, and the backward movement can be carried out, and the change of direction can be caused in order to continue traveling. Being inclusive of the case where there is a step in another direction, after a backward movement or a forward movement, a change of direction is caused whereby it can be prevented that a self-propelled electronic device may be fallen down going through the step, or a drive wheel may be derailed.

(iv) The drive wheel may include a right drive wheel positioned at a right side of the bottom of the housing and a left drive wheel positioned at a left side of the bottom of the housing corresponding to the drive wheel respectively. The travel control unit may change the course of the housing by differentiating driving speed or driving directions between the right drive wheel and the left drive wheel.

Thereby, the travel control unit can change the traveling course by a simple structure that the right drive wheel and the left drive wheel are driven at an independent driving speed or in an independent driving direction.

(v) The floor surface detection sensor may be positioned on the bottom of the housing and, at least, at a front or rear side of each drive wheel.

Thereby, the traveling is performed while, successively, detecting whether or not there is a floor surface in the front side or the rear side of each drive wheel, whereby it can be prevented that a drive wheel and a follower wheel may be fallen down going through the step or may be derailed.

Preferable embodiments of the present invention should include any combination of some of the described preferable embodiments.

Further, the present specification describes a self-propelled electronic device including: a drive wheel disposed at a bottom of a housing for traveling the housing; a contact sensor for detecting that the front of the housing comes in contact with an obstacle; and a travel control unit for moving the housing to the backward when a contact with the obstacle is detected, by successively referring to the detection of the obstacle contact sensor, and for changing a direction of the housing when the contact with the obstacle is not detected, thereby changing a traveling direction, wherein the travel control unit stops the backward movement, and change the direction of the housing, if a predetermined period has been passed after the contact with the obstacle is detected and the housing is moved backward, and the obstacle contact sensor still detects the contact.

According to this embodiment, even if the backward movement of the housing is performed by detecting the contact with the obstacle, and a drive wheel may be slipped and be unable to be separated from the obstacle, the backward movement stops and the change of direction of the housing is performed after a predetermined period has been passed, whereby there is a case where it can separate from the obstacle by the change of direction, and can travel. Accordingly, regardless of undulations of a floor surface and shapes of the obstacle, a self-propelled electronic device for smoothly traveling can be realized.

According to a further preferable embodiment of the present invention, the drive wheel includes at least a right drive wheel positioned at the right of the bottom of the housing and a left drive wheel positioned at the left of the bottom of the housing. The travel control unit may change a direction of the housing by differentiating driving speed or driving directions between the right drive wheel and the left drive wheel. If the contact is detected after a predetermined period has been passed, a change of direction of the housing is controlled in a predetermined direction and at a predetermined angle. If the obstacle contact sensor detects the contact after the change of direction, a further change of direction of the housing may be controlled in a direction reverse to the above-mentioned direction and at a predetermined angle.

According to this preferable embodiment, even if the housing cannot separate from the obstacle after the change of direction of the housing is controlled in a predetermined direction and at a predetermined angle, there is a case where the traveling being separated from the obstacle can be possible by causing the change of direction in the reverse direction. Accordingly, regardless of undulations of a floor surface and shapes of the obstacle, a self-propelled electronic device for smoothly traveling can be realized.

Further, if the obstacle contact sensor still detects the contact after the change of direction of the housing is performed in a predetermined direction and a reverse direction thereto, and at a predetermined angle, the travel control unit controls so that the change of direction of the housing is controlled in a predetermined direction and at a predetermined angle. If the obstacle contact sensor still detects the contact after this change of direction, the travel control unit further may control a retry that the change of direction of the housing is performed in a direction reverse to the direction, and at a predetermined angle, by a predetermined time.

According to a further preferable embodiment, even if the housing cannot separate from the obstacle after the change of direction of the housing is performed at a predetermined angle, the retry is repeated whereby there is a case where the direction of the housing can be gradually changed and the housing can separate from the obstacle and travel. Accordingly, regardless of undulations of a floor surface and shapes of the obstacle, a self-propelled electronic device for smoothly traveling can be realized.

If the contact with obstacle is detected, a first angle in which the change of direction is performed when the contact is not detected after the backward movement is different from a second angle in which the change of direction performed when the contact is still detected after the backward movement. The second angle may be greater than the first angle.

According to a further preferable embodiment, while a drive wheel slips, the angle of the change of direction is set to be greater than a normal case. Thereby, as compared with a case of the same angle, there is a high possibility that, while the drive wheel blips, the change of direction is gradually advanced to thereby separate from the obstacle. Accordingly, regardless of undulations of a floor surface and shapes of the obstacle, a self-propelled electronic device for smoothly traveling can be realized.

The obstacle contact sensor includes a left obstacle contact sensor for detecting that a left oblique-forward place of the housing comes in contact with an obstacle, and a right obstacle contact sensor for detecting that a right oblique-forward place of the housing comes in contact with an obstacle. The travel control unit may control to change the direction of the housing in a right direction, for the first time, in order to change the course of the housing in the right direction, when the left obstacle contact sensor detects the contact, and may control to change the direction of the housing in a left direction, for the first time, in order to change the course of the housing in the left direction, then the right obstacle contact sensor detects the contact.

According to a further preferable embodiment, the direction of the housing is changed to a direction without the obstacle, for the first time. Thereby, as compared with a case of the change of direction in a direction with the obstacle, there is a high possibility that the housing can be separated from the obstacle. Accordingly, regardless of undulations of a floor surface and shapes of the obstacle, a self-propelled electronic device for smoothly traveling can be realized.

In addition to the above-described embodiments, there can be various modified examples of the invention. Such modified examples should not be deemed to be out of the scope of the invention. The invention should include all the modified examples within the meaning and range of equivalency of scope of the claims.

EXPLANATION OF NUMERALS

1 Self-propelled vacuum cleaner
2 Housing
2a Bottom plate
$2b_1$ Top plate front part
$2b_{11}$ Air aperture
$2b_2$ Lid part
$2c_1$ Side plate front half part
$2c_2$ Side plate rear half part
2d Inner structural wall
9 Rotary brush
10 Side brush
11 Control unit
11a Travel control unit
11b Through-view region decision unit
11S Circuit board
12 Rechargeable battery
13 Charging connecting unit
14 Obstacle detection unit
14A Ultrasonic wave receiving unit
14B Ultrasonic wave transmitting unit
14C Obstacle contact sensor
15 Dust collection unit
15a Dust container
15b Dust collecting filter
18 Floor surface detection sensor
20 Jyro sensor
21L Left drive wheel motor
21R Right wheel drive motor
22L Left drive wheel
22R Right drive wheel
23 Drive wheel unit
24 Navigation signal receiving unit
26 Rear wheel
31 Suction port
32 First exhaust port
33 Second exhaust port
55 Notification unit
61 Storage unit
114 Duct
115 Electric air blower
120 Ion generation unit
121L Left wheel driver
121R Right wheel driver
123 Air blower driver
125 Brush driver
201 Charging stand
202 Charging terminal unit
203 Navigation signal sending unit
221 Drive wheel holder
221a Inner case unit
221b Outer case unit
$221a_1$, $221b_1$ Cylindrical unit
221r Gear accommodation chamber
223a First gear
$223b_2$ Second gear
$223b_3$ Third gear $223c_2$ Fourth gear
$223c_3$ Fifth gear
$223d_2$ Sixth gear
223 Drive transmission mechanism
231 Support member
241 Biasing member
251 Right shielding plate
253 Drive wheel sensor
253L Left drive wheel sensor
253R Right drive wheel sensor
F Floor surface
ST Step
$m_1$ Drive shaft
$P_1$ First axis
$P_2$ Second axis

The invention claimed is:

1. A self-propelled electronic device comprising:
at least one drive wheel disposed at a bottom of a housing, the drive wheel traveling the housing while being displaced in a vertical direction in accordance with undulations of a floor surface;
a drive wheel sensor for detecting a position of the drive wheel relative to the housing;
a floor detection sensor for detecting a distance between the bottom of the housing and the floor surface; and
a travel control unit for deciding a course of the housing based on determination that there exists a step on the floor surface if the distance detected by the floor detection sensor is longer than a predetermined reference distance, or, otherwise, the position of the drive wheel detected by the drive wheel sensor is lower than a predetermined reference position, by successively referring to output of the drive wheel sensor and the floor detection sensor, wherein
the travel control unit further refers to the distance detected by the floor detection sensor, if the position of the drive wheel detected by the drive wheel sensor is lower than a predetermined reference position, and
the travel control unit performs avoidance traveling control of the housing to avoid the step, if the distance detected by the floor detection sensor is longer than the predetermined reference distance, whereas
the travel control unit, does not perform the avoidance traveling control of the housing and continues the traveling of the housing, if the distance detected by the floor detection sensor is the predetermined reference distance or shorter.

2. The self-propelled electronic device according to claim 1, wherein after the position detected by the drive wheel sensor is lower than the predetermined reference position and the travel control unit determines not to perform the avoidance traveling control of the housing, the travel control unit stops the drive wheel if the detected position does not change to be higher than the predetermined reference position after a predetermined time has been passed.

3. The self-propelled electronic device according to claim 1, wherein the avoidance traveling control of the housing is a traveling operation in which the traveling of the housing is temporarily stopped, a backward movement or forward movement of the housing is performed, and, thereafter, a change of direction of the housing is carried out.

4. The self-propelled electronic device according to claim 1, comprising a right drive wheel positioned at a right side of the bottom of the housing and a left drive wheel positioned at a left side of the bottom of the housing, and the travel control unit changes the course of the housing by differentiating driving speed or driving directions between the right drive wheel and the left drive wheel.

5. The self-propelled electronic device according to claim 3, wherein the floor surface detection sensor is positioned on the bottom of the housing and, at least, at a front or rear side of the drive wheel.

6. The self-propelled electronic device according to claim 2, wherein the avoidance traveling control of the housing is a traveling operation in which the traveling of the housing is temporarily stopped, a backward movement or forward movement of the housing is performed, and, thereafter, a change of direction of the housing is carried out.

7. The self-propelled electronic device according to claim 2, comprising a right drive wheel positioned at a right side of the bottom of the housing and a left drive wheel positioned at a left side of the bottom of the housing, and the travel control unit changes the course of the housing by differentiating driving speed or driving directions between the right drive wheel and the left drive wheel.

* * * * *